US012234667B1

(12) United States Patent
Heinrich et al.

(10) Patent No.: US 12,234,667 B1
(45) Date of Patent: Feb. 25, 2025

(54) TAMPER-RESISTANT LOCKING AND NOTIFICATION SYSTEM FOR DETENTION CELLS

(71) Applicant: Willo Products Company, LLC, Decatur, AL (US)

(72) Inventors: Matt P. Heinrich, Decatur, AL (US); Brian S. Foss, Decatur, AL (US)

(73) Assignee: WILLO PRODUCTS COMPANY, INC., Decatur, AL (US)

( * ) Notice: Subject to any disclaimer, the term of this patent is extended or adjusted under 35 U.S.C. 154(b) by 0 days.

(21) Appl. No.: 18/447,693

(22) Filed: Aug. 10, 2023

Related U.S. Application Data

(63) Continuation of application No. 17/316,215, filed on May 10, 2021, now Pat. No. 11,732,501, which is a continuation of application No. 16/421,786, filed on May 24, 2019, now Pat. No. 11,002,041, which is a continuation of application No. 15/679,417, filed on Aug. 17, 2017, now Pat. No. 10,316,546, which is a continuation-in-part of application No. 15/291,242, filed on Oct. 12, 2016, now Pat. No. 10,385,587, which is a continuation of application No.

(Continued)

(51) Int. Cl.
*E05B 17/20* (2006.01)

(52) U.S. Cl.
CPC ................................ *E05B 17/2088* (2013.01)

(58) Field of Classification Search
CPC ............. Y10T 70/7915; Y10T 70/7921; Y10T 70/7927; E05B 17/2084; E05B 17/2088; E05B 17/2003; E05B 15/0205; E05B 2015/023
USPC .............. 70/416, 417, 418; 292/346; 49/460
See application file for complete search history.

(56) References Cited

U.S. PATENT DOCUMENTS 962,792 A 6/1910 Joseph
975,675 A 11/1910 Bumiller (Continued)

FOREIGN PATENT DOCUMENTS

DE 9306060 U1 7/1993
DE 102009019731 A1 12/2011

(Continued)

OTHER PUBLICATIONS

Final Office Action mailed on Nov. 14, 2022 for U.S. Appl. No. 17/316,215.

(Continued)

*Primary Examiner* — Suzanne L Barrett
(74) *Attorney, Agent, or Firm* — Miller Johnson

(57) ABSTRACT

A locking system that has an opening in a door adapted and arranged for receiving a lock bolt and a lock fixed in a wall for actuating a lock bolt adapting and arranged for being received by the opening in the door when the door is closed. Alternatively, the locking system is mounted on the exterior of the detention cell door and the adjacent exterior cell wall. The locking system further comprises a blocking strip protruding from a doorjamb, the strip coupled to the door jamb, the strip coupled to the door jamb and positioned adjacent the lock bolt for blocking access to the lock bolt between the door and the doorjamb. The locking system further comprises a system for monitoring and reporting the status of a detention cell door, the lock bolt, and the roller bolt.

20 Claims, 24 Drawing Sheets

Related U.S. Application Data

14/834,253, filed on Aug. 24, 2015, now Pat. No. 9,482,030.

(60) Provisional application No. 62/467,305, filed on Mar. 6, 2017, provisional application No. 62/443,127, filed on Jan. 6, 2017, provisional application No. 62/040,667, filed on Aug. 22, 2014, provisional application No. 62/062,406, filed on Oct. 10, 2014.

(56) References Cited

U.S. PATENT DOCUMENTS

| | | | | | |
|---|---|---|---|---|---|
| 1,579,139 | A | | 3/1926 | Phillips | |
| 1,665,243 | A | | 4/1928 | Whitehouse | |
| 1,723,126 | A | | 8/1929 | Frank | |
| 1,739,897 | A | | 12/1929 | Garber | |
| 1,940,639 | A | | 12/1933 | White | |
| 2,146,552 | A | | 2/1939 | Ralston | |
| 2,170,521 | A | | 8/1939 | Rodth | |
| 2,290,114 | A | | 7/1942 | Metzler | |
| 2,397,926 | A | | 4/1946 | Jesse | |
| 2,417,167 | A | | 3/1947 | James | |
| 2,454,904 | A | | 11/1948 | Wylie | |
| 2,484,024 | A | * | 10/1949 | Garberding | E05D 15/00 292/346 |
| 2,796,281 | A | * | 6/1957 | Philpott | E05B 17/2003 292/346 |
| 3,097,008 | A | * | 7/1963 | Gravelle | E05B 17/2003 292/346 |
| 3,271,063 | A | | 9/1966 | Garrett | |
| 3,290,081 | A | | 12/1966 | Sushan | |
| 3,405,962 | A | * | 10/1968 | Sushan | E05B 17/2003 292/346 |
| 3,524,669 | A | * | 8/1970 | Reid | E05B 17/2003 292/346 |
| 3,592,498 | A | | 7/1971 | Raccuglia | |
| 3,645,045 | A | | 2/1972 | Gervis | |
| 3,893,723 | A | | 7/1975 | Boule | |
| 3,934,910 | A | | 1/1976 | Radke | |
| 4,130,311 | A | | 12/1978 | Sushan | |
| 4,178,027 | A | | 12/1979 | Charron | |
| 4,180,287 | A | | 12/1979 | Young | |
| 4,279,436 | A | | 7/1981 | Heffel | |
| 4,345,787 | A | | 8/1982 | Dabrowski | |
| 4,390,199 | A | | 6/1983 | Taylor | |
| 4,531,633 | A | | 7/1985 | Evans | |
| 4,648,253 | A | | 3/1987 | Imhoff | |
| 4,691,542 | A | | 9/1987 | Young | |
| 4,813,254 | A | | 3/1989 | Foshee | |
| 4,861,082 | A | | 8/1989 | Priola | |
| 4,887,856 | A | | 12/1989 | Percoco | |
| 4,913,475 | A | | 4/1990 | Bushnell | |
| 5,074,606 | A | | 12/1991 | Priola | |
| 5,172,574 | A | | 12/1992 | Perfetto | |
| 5,255,542 | A | | 10/1993 | Fortin | |
| 5,267,461 | A | | 12/1993 | Eizen | |
| 5,299,385 | A | | 4/1994 | McConnell | |
| 5,406,814 | A | | 4/1995 | Zeager | |
| 5,415,020 | A | | 5/1995 | Allenbaugh | |
| 5,544,506 | A | | 8/1996 | Nakano | |
| 5,845,520 | A | | 12/1998 | Dolev | |
| 5,881,585 | A | | 3/1999 | Kang | |
| 6,058,746 | A | | 5/2000 | Mirshafiee | |
| 6,282,931 | B1 | | 9/2001 | Padiak | |
| 6,293,131 | B1 | | 9/2001 | Lemettinen | |
| 6,374,650 | B1 | | 4/2002 | Newman | |
| 6,494,064 | B1 | | 12/2002 | Pena | |
| 6,581,333 | B2 | | 6/2003 | Kimball | |
| 6,609,739 | B1 | | 8/2003 | Avganim | |
| 6,684,570 | B1 | | 2/2004 | Robledo | |
| 6,826,937 | B2 | | 12/2004 | Su | |
| 7,296,448 | B1 | | 11/2007 | Shaw | |
| 7,707,862 | B2 | | 5/2010 | Walls | |
| 7,836,735 | B2 | | 11/2010 | Liu | |
| 7,874,189 | B2 | | 1/2011 | Martin | |
| 8,528,272 | B1 | | 9/2013 | Foss | |
| 8,739,582 | B2 | | 6/2014 | Diesing | |
| 8,800,329 | B1 | | 8/2014 | Dolev | |
| 9,045,927 | B1 | | 6/2015 | Hoffberg | |
| 9,482,030 | B2 | | 11/2016 | Heinrich | |
| 10,316,546 | B1 | | 6/2019 | Ozier | |
| 10,385,587 | B1 | | 8/2019 | Heinrich | |
| 11,002,041 | B1 | | 5/2021 | Ozier | |
| 11,268,299 | B2 | | 3/2022 | Guerard | |
| 11,732,501 | B1 | * | 8/2023 | Ozier | E05B 45/06 70/408 |
| 2002/0053165 | A1 | | 5/2002 | Secoolish | |
| 2006/0144100 | A1 | | 7/2006 | Thomsen | |
| 2007/0240465 | A1 | | 10/2007 | Clifford | |
| 2010/0269431 | A1 | | 10/2010 | Young | |
| 2016/0053513 | A1 | | 2/2016 | Heinrich | |

FOREIGN PATENT DOCUMENTS

| | | | |
|---|---|---|---|
| DE | 102014006474 | A1 | 10/2015 |
| GB | 2217371 | A | 10/1989 |

OTHER PUBLICATIONS

Non-Final Office Action mailed on May 21, 2020 for U.S. Appl. No. 16/421,786.

Non-Final Office Action mailed Jun. 5, 2018 for U.S. Appl. No. 15/679,417.

Non-Final Office Action mailed Feb. 22, 2017 for U.S. Appl. No. 15/291,242.

Final Office Action mailed Sep. 28, 2017 for U.S. Appl. No. 15/291,242.

Non-Final Office Action mailed Jan. 8, 2016 for U.S. Appl. No. 14/834,253.

Final Office Action mailed Sep. 6, 2016 for U.S. Appl. No. 14/834,253.

* cited by examiner

3 INPUTS LOGIC

| SECURE | INSECURE | TAMPER | SEC-OUT | INS-OUT | FL-OUT1 | FL-OUT2 | | |
|---|---|---|---|---|---|---|---|---|
| I1 | I2 | I3 | R1 | R2 | R3-NO | R3-NC | GREEN LED | RED LED |
| 0 | 0 | 0 | OPEN | CLOSED | OPEN | CLOSED | OFF | SOLID |
| 0 | 0 | 1 | OPEN | CLOSED | FLASH | FLASH | OFF | FLASH |
| 0 | 1 | 0 | OPEN | CLOSED | OPEN | CLOSED | OFF | SOLID |
| 0 | 1 | 1 | OPEN | CLOSED | FLASH | FLASH | OFF | FLASH |
| 1 | 0 | 0 | CLOSED | OPEN | OPEN | CLOSED | SOLID | OFF |
| 1 | 0 | 1 | CLOSED | OPEN | OPEN | CLOSED | SOLID | OFF |
| 1 | 1 | 0 | OPEN | CLOSED | OPEN | CLOSED | OFF | SOLID |
| 1 | 1 | 1 | OPEN | CLOSED | FLASH | FLASH | OFF | FLASH |

FIG. 26

TAMPER-RESISTANT LOCKING AND NOTIFICATION SYSTEM FOR DETENTION CELLS

CROSS-REFERENCE TO RELATED APPLICATIONS

This application is a continuation of U.S. patent application Ser. No. 17/316,215 filed May 10, 2021, which is a continuation of U.S. patent application Ser. No. 16/421,786 filed May 24, 2019, which is a continuation of U.S. patent application Ser. No. 15/679,417 filed Aug. 17, 2017, which claims benefit to U.S. Provisional Application No. 62/467,305 filed Mar. 6, 2017, and U.S. Provisional Application No. 62/443,127 filed Jan. 6, 2017, and is a continuation-in-part of U.S. patent application Ser. No. 15/291,242 filed Oct. 12, 2016, which is a continuation of U.S. patent application Ser. No. 14/834,253 filed Aug. 24, 2015, which claims benefit to U.S. Provisional Application No. 62/062,406 filed Oct. 10, 2014, and U.S. Provisional Application No. 62/040,667 filed Aug. 22, 2014. The entire disclosures of the above applications are incorporated herein by reference.

BACKGROUND

Oftentimes, a plurality of individuals (e.g., inmates) is housed in a large facility when they are given a sentence by a court. Each individual housed in the facility is typically provided his/her own room (i.e., a cell) that he/she may share with a cell mate.

While there are times that the individuals are let out of their cells, there are periods of time when it is preferable that the inmates be locked in their cells. Inmates have been known to use objects, such as credit cards, to unlock cell door locks. In this regard, the inmate may insert the object between a doorjamb and a door, slide the object in a downward motion, and unlock a latch or bolt. Inmates have also been known to place trash or other objects into the strike plate or lock recess to keep the bolt from fully engaging and securing the door.

Another way the prisoners will defeat the locks are by placing a piece of paper or cloth in between the strike plate and the lock bolt, so the inmate can push on the door while removing the paper. By slipping the bolt in this way, the lock will disengage.

Another way still to damage a detention cell lock, however, is to simply slam the door. Due to the lock bolt's extended position when the door is opened, the weight of the door can apply enough speed and power to damage the lock's internal bolt work.

In rare instances detention cell locks can also be picked if not all of the lock cylinders are keyed with security pins. Without security pins, the locks can be raked open, which is the simplest form of picking. With security pins, however, the locks can be quite difficult to pick.

The present invention offers a lock and monitoring system that addresses these problems.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 26 shows the logic used by the logic engine for a three-input circuit.

DETAILED DESCRIPTION

The various embodiments of the present invention and their advantages are best understood by referring to FIGS. 1 through 26 of the drawings. The elements of the drawings are not necessarily to scale, emphasis instead being placed upon clearly illustrating the principles of the invention. Throughout the drawings, like numerals are used for like and corresponding parts of the various drawings.

The various embodiments of the present invention and their advantages are best understood by referring to FIGS. 1 through 26 of the drawings. The elements of the drawings are not necessarily to scale, emphasis instead being placed upon clearly illustrating the principles of the invention. Throughout the drawings, like numerals are used for like and corresponding parts of the various drawings.

Figure 1:
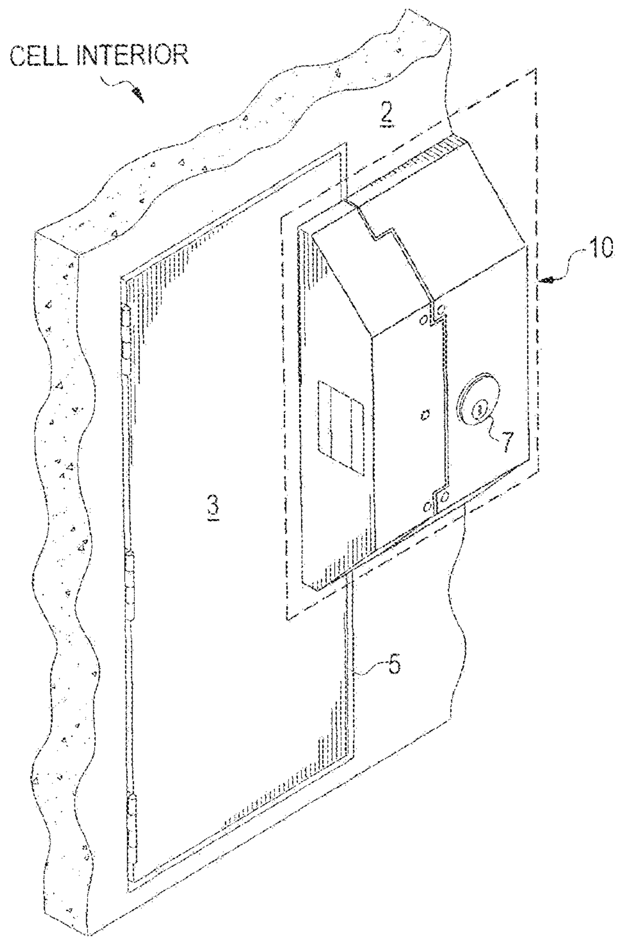
FIG. 1 is a perspective view of an exemplary lock housing assembly for mounting on the exterior surfaces of the door and wall (partial views) of a detention facility cell.

FIG. 1 depicts an exemplary lock housing assembly 10 enclosed in which is a lock mechanism 7. The housing assembly 10 is mounted on the exterior surfaces of a cell door 3 and wall 2 across the doorjamb 5.

Figure 2A:
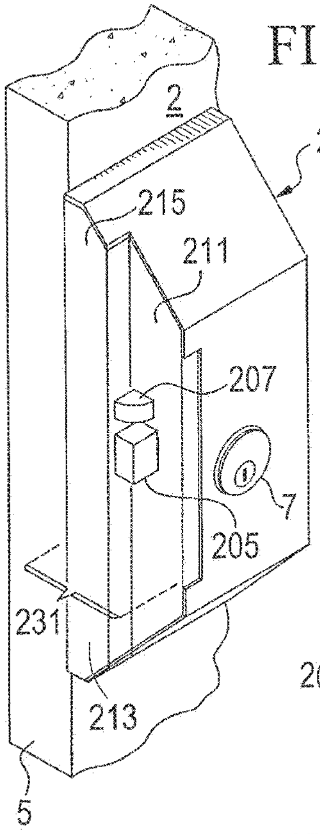
FIG. 2A depicts an exemplary lock mechanism housing mounted to the exterior surface of a cell wall and door frame.

FIG. 2A depicts a lock mechanism housing 201 of the lock housing assembly 10 (FIG. 1) that is mounted to the wall 2 adjacent the existing doorjamb 5. The lock mechanism housing 201 supports the lock mechanism 7, and is configured with a frame lock facing wall 231 step-shaped to include a rabbet 211 in which is defined openings through which a lock bolt 205 and a lock roller bolt 207 may be selectively extended when the cell door 3 is closed. The frame lock facing wall 231 is further shaped to define a stop 213, analogous to a conventional door stop that is defined by a soffit in a conventional door frame. The stop 213 is essentially a perpendicular transition between the rabbet 211 and a shoulder 215 and extends generally parallel to the cell wall exterior surface. The shoulder 215 extends between the wall surface and the stop 213.

Figure 2B:
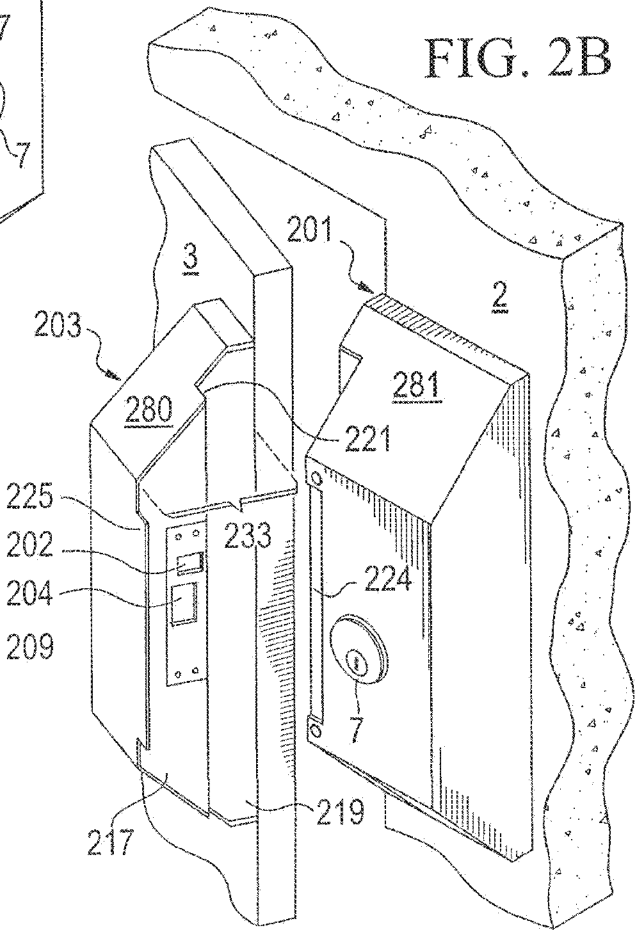
FIG. 2B shows an opposing view of the exemplary lock mechanism housing of FIG. 2B along with a pocket lock housing mounted to the exterior surface of a cell door.

FIG. 2B depicts a lock pocket housing 203 mounted to the exterior surface of the door 3. The lock pocket housing 203 comprises a door strike mounting wall 233 formed to define surfaces structurally opposing those defined by the frame lock facing wall 231.

In this regard, the door strike mounting wall 233 comprises a rabbet 219, a stop mating surface 221, and a shoulder 217. The door strike mounting wall 233 is shaped to include the stop mating surface 221 interposed between the shoulder 217 and the rabbet 219. The rabbet 219 abuts and mates with the shoulder 215 (FIG. 2A) when the door 3 is closed, and the stop mating surface 221 abuts and mates with the stop 213 (FIG. 2A) when the door 3 is closed. Additionally, the shoulder 217 abuts and mates with the rabbet 211 (FIG. 2A).

The shoulder 217 comprises an opening 204 for receiving the lock bolt 205 (FIG. 2A). Further, the shoulder 217 comprises an opening 202 for receiving the lock roller bolt 207 (FIG. 2A). In one embodiment, the shoulder 217 comprises a strike plate 209 that is adapted and arranged to protect the structure of the shoulder portion 217 surrounding the openings 204, 202.

In one embodiment, a guard flange 225 extends laterally from the front of the lock pocket housing 203. In such an embodiment, the lock mechanism housing 201 comprises a rabbet 224 dimensioned to receive the guard flange 225 when the door 3 is closed. Mating the guard flange 225 and the rabbet 224 results in a flush face across the front of the assembly 10. The guard flange 225 inhibits access to the locking bolts from the outside of the cell when the cell door 3 is closed.

Note that in the embodiment shown, the lock mechanism housing 201 has a sloped upper surface 281. The sloped upper surface 281 protects lock mechanism housing 201 from overhead impacts. Similarly, the lock pocket housing 203 also has a sloped upper surface 280 that protects the lock pocket housing 203 from overhead impact.

Figure 4:
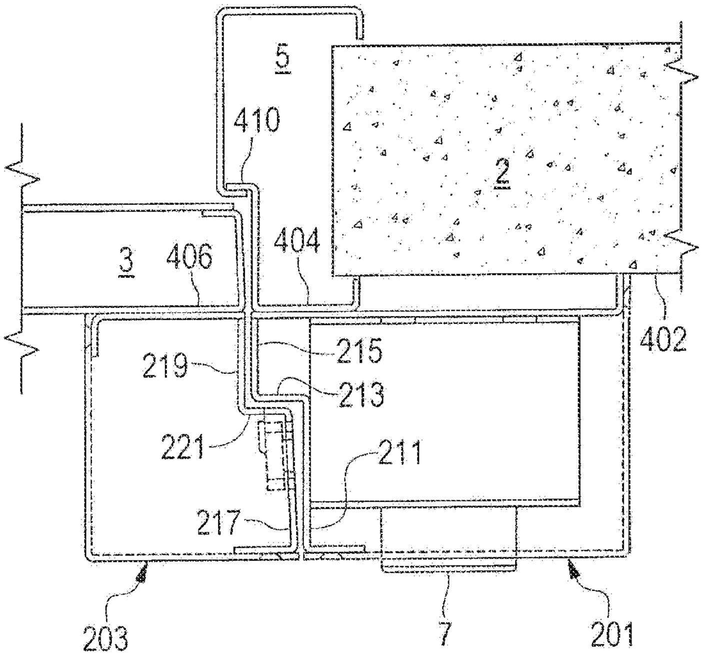
FIG. 4 is a section view from above showing the engaging of the lock housing assembly mounted on the exterior surfaces of the cell door and cell walls.

FIG. 4 is a cross-sectional plan view depicting the lock mechanism housing 201 mounted on an exterior surface 402 of the cell wall 2 and an exterior surface 404 of the door jamb 5. The lock pocket housing 203 similarly is mounted on an exterior surface 406 of the existing door 3. Notably, the doorjamb 5 comprises a door stop 410 against which the door 3 is seated when the door 3 is closed.

In the embodiment depicted, the housings 201, 203 are shaped such that when the door 3 is closed the stop mating surface 221 of lock pocket housing 203 is seated against the stop 213 of the lock mechanism housing 201. Further, the housings 201, 203 are formed so that the shoulder 215 and the rabbet 219 extend outward from the doorjamb 5 and door 3, respectively. Further, stop 213 extends laterally and offset in relation to doorjamb 5. Moreover, respective opposing surfaces 215, 219 and 211, 217, are matingly stepped and dimensioned appropriately to provide a close engagement of the two housing components 201, 203, minimizing the gap between the two opposing surfaces.

In one embodiment, the depth of the shoulder portion 215 blocks objects that may be inserted between the lock bolt 205 and the lock roller bolt 207 and their respective openings 204, 202 in the lock pocket housing 203. In this regard, an inmate within a cell will be unable to insert, for example, a playing card or a credit card between the door jamb 5 and the door 3 in order to actuate the lock bolt 205 and/or the roller bot 207.

Furthermore, the width of the stop 213 is greater than that of the standard door stop which is about ⅝ inch. In one embodiment, the width of the stop 213 is between about ⅞ inch to about one inch, or greater, including widths of about 15/16 inch. As with the extended depth of the shoulder portion 215, the wider stop 213 reduces the ability of an inmate to tamper with the lock function by interposing a stiff but flexible object between the door jamb 5 and the door 3.

FIGS. 3A through 3D show varying aspects of an exemplary lock housing assembly 10. In particular, FIGS. 3A through 3D depict exemplary mounting of the lock housing assembly 10 to the cell door 3 and cell wall 2 exterior surfaces. In this regard, the lock housing assembly may comprise a wall mounting plate 301 and a door mounting plate 303 for mounting of the lock mechanism housing 203 and the lock pocket housing 201, respectively.

Various methods are known in the art for securely attaching similar structures to wall and door surfaces, and thus, the following description is merely provided for illustration, and should not be considered to be the sole technique for mounting of the lock housing assembly 10.

Figure 3A:
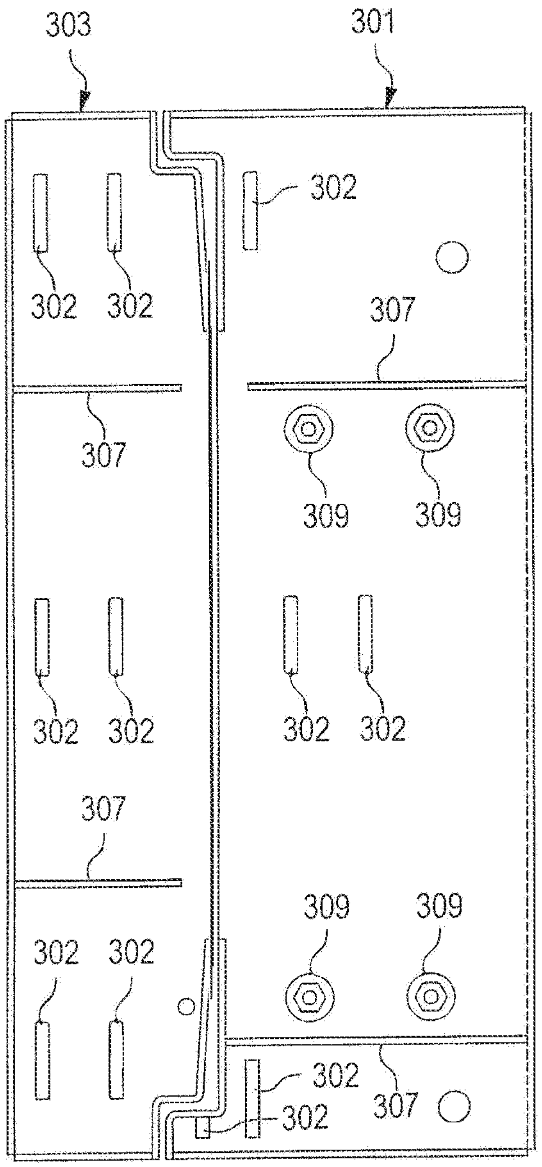
FIG. 3A is an elevation view of respective exemplary mounting plates for mounting the lock housing assembly.

FIG. 3A depicts an exemplary wall mounting plate 301 and an exemplary door mounting plate 303. The wall mounting plate 301 mounts the lock mechanism housing 201 (FIG. 2B) to the cell wall 2, and the door mounting plate 303 mounts the lock pocket housing 203 to the door 5.

In the embodiment depicted in FIG. 3A, there are various slots 302, which are described further herein. In addition, there are a number of fasteners 309. Further, there is a plurality of reinforcement ribs 307.

Figure 3C:
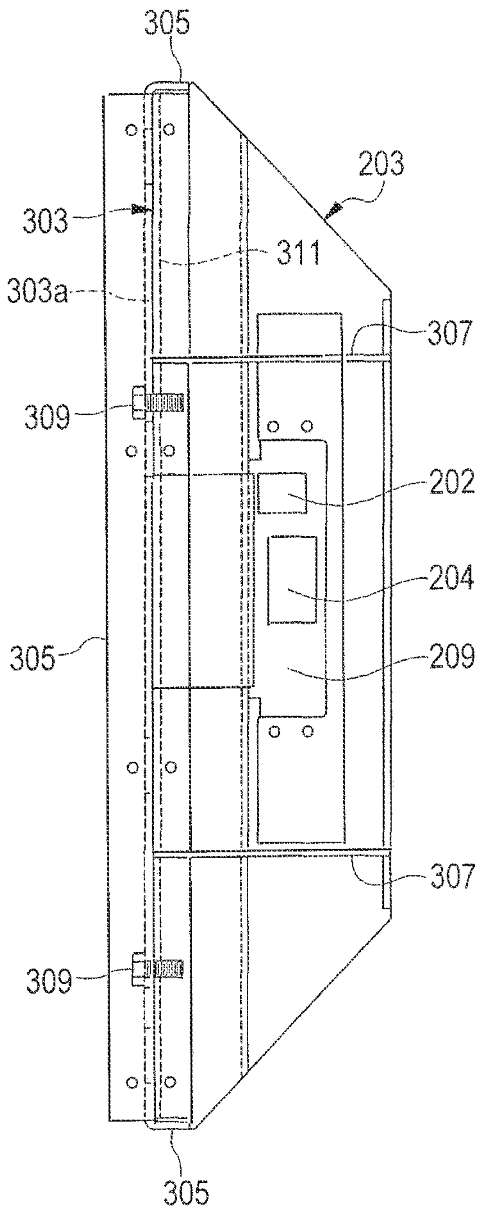
FIG. 3C is a side elevation view of an exemplary lock pocket housing.

FIG. 3C depicts a side plan view showing the mounting plate 303 in conjunction with the lock pocket housing 203. FIG. 3C depicts the mounting plate 303 retaining the lock pocket housing 203 to the door 5 (FIG. 2B). In the embodiment depicted, the mounting plate 303 comprises a back plate 303*a* that comprises the slots 302 (FIG. 3A) that provides access to the cell door 5 for welding the mounting plate 303 to the cell door 5. Note that in addition to welding the mounting plate to the cell door 5, the mounting plate 303 may also be fastened via bolts or the like to the cell door 5.

The mounting plate 303 further comprises a plurality of attachment flanges 305 that extend perpendicularly, in either direction, from the back plate 303*a*. The flanges 305 may comprise fastener openings to allow attachment of the housing 203 to the mounting plate 303. Additionally, the housing 203 may include a back wall 311 that attaches to the mounting plate 303 with a plurality of suitable fasteners 309 through openings in the wall 311. Additionally, the lock pocket housing 203 may include reinforcing ribs 307 and other structures for supporting and mounting of a locking mechanism.

Figure 3D:
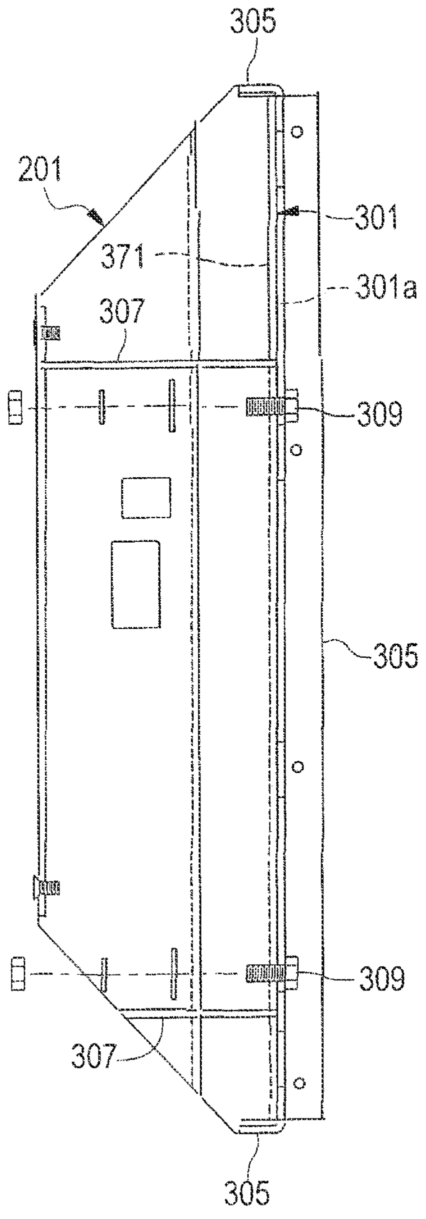
FIG. 3D is a side elevation view of an exemplary lock mechanism housing.

FIG. 3D depicts a side plan view showing the mounting plate 301 in conjunction with the lock mechanism housing 201. FIG. 3C depicts the mounting plate 301 retaining the lock mechanism housing 201 to the cell wall 2 (FIG. 2B). In the embodiment depicted, the mounting plate 301 comprises a back plate 301*a* that comprises the slots 302 (FIG. 3A) that provides access to the cell door 5 for welding the mounting plate 301 to the cell wall 2. Note that in addition to welding the mounting plate to the cell wall 2, the mounting plate 301 may also be fastened via bolts or the like to the cell wall 2.

The mounting plate 301 further comprises a plurality of attachment flanges 305 that extend perpendicularly, in either direction, from the back plate 301*a*. The flanges 305 may comprise fastener openings to allow attachment of the housing 201 to the mounting plate 301. Additionally, the housing 201 may include a back wall 371 that attaches to the mounting plate 301 with a plurality of suitable fasteners 309 through openings in the wall 371. Additionally, the lock mechanism housing 201 may include reinforcing ribs 307 and other structures for supporting and mounting of a locking mechanism.

Note that in one embodiment the lock pocket housing 203 is hollow. In this regard, an inmate will stuff any kind of debris, such as paper scraps or candy or food wrappers, in the bolt hole in the door frame, which, if it is shallow enough, will fill in a relatively short amount of time and may prevent the lock bolt from fully engaging the bolt hole, compromising the security of the cell. A hollow lock pocket housing 203 deters this tactic as it would require a greater amount of debris and a longer period of time to full sufficiently to interfere with the lock bolt operation. In addition, the housing 203 may optionally be configured with an opening to allow periodic cleaning of the housing interior.

Figure 3B:
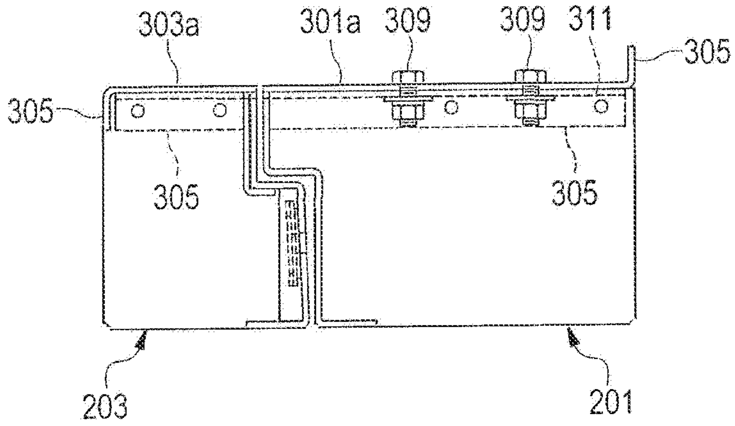
FIG. 3B is a plan view from above of the lock housing assembly of FIG. 1.

FIG. 3B depicts a top plan view of the lock housing assembly 10 with the mounting plates 01, 303. The lock mechanism housing 201 is coupled to the mounting plate 301. Notably, the lock mechanism housing 201 is coupled to the back plate 301*a*, which is coupled to the lock mechanism housing 201 via fasteners 309, e.g., bolts.

The lock pocket housing 203 is coupled to the mounting plate 303. Notably, the lock pocket housing 203 is coupled to the back plate 303*a*, which is coupled to the lock pocket housing 203 via fasteners 309, e.g., bolts.

It will be appreciated that since the respective housings are surface-mounted to the existing door and frame, the structural integrity of the wall and frame are preserved. Further, installation time, and thus, down time is greatly reduced, which in turn, reduces disruption of the security routine and temporary relocation of inmates during installation.

Figure 5:
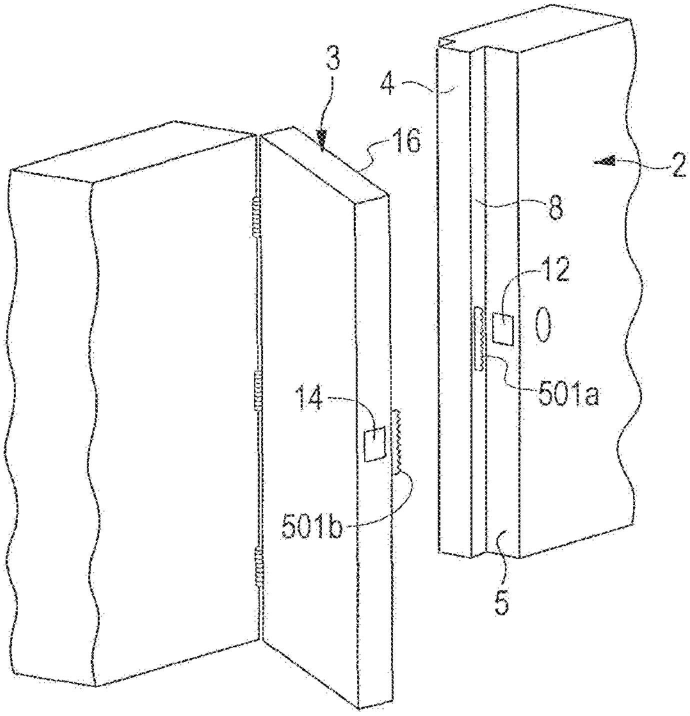
FIG. 5 depicts an exemplary embodiment of a tamper-resistant locking system in accordance with an embodiment of the present disclosure.
Figure 6:
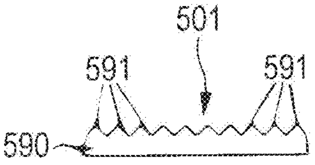
FIG. 6 is an exemplary tamper-resistance strip used in the tamper-resistant locking system depicted in FIG. 5.
Figure 7:
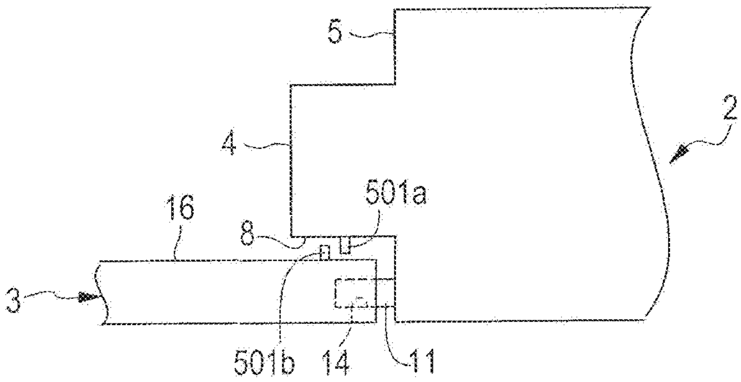
FIG. 7 is a plan view from above the door and frame with the door closed showing the tamper-resistant locking system of FIG. 5.

FIGS. 5 through 7 depict an exemplary tampering prevention mechanism in accordance with an embodiment of the present disclosure.

FIG. 5 depicts a door 3 and a door jamb 5. The door jamb 5 comprises a soffit 4 extending inwardly toward the doorway opening and forming a stop 8 against which the door 3 is seated when closed.

In the embodiment depicted, a locking mechanism may be mounted in the cell wall 2 and comprise an opening 12 through which a latch or lock bolt may be selectively extended. In the open edge of the door 3, which is opposite the hinged edge, the door 3 comprises a receiver opening 14 for receiving the lock bolt when it is selected to extend and thereby lock the door 3 in its closed position.

A tamper-resistant member 501*a* is mounted on the stop 8 extending perpendicularly therefrom. FIG. 6 depicts an exemplary tamper-resistant member 501. With reference to FIG. 6, the tamper-resistant member 501 is a strip of metal material 590. Formed within the metal strip 590 is a plurality of teeth 591. The toothed tamper-resistant member, when mounted perpendicularly on the stop 8 can prevent insertion of objects through the doorjamb 5.

Likewise, a tamper-resistant member 501*b* is mounted on the closing face 16 of the door 3 extending perpendicularly therefrom. FIG. 6 depicts an exemplary tamper-resistant member 501. With reference to FIG. 6, the tamper-resistant member 501 is a strip of metal material 590. Formed within the metal strip 590 is a plurality of teeth 591. The toothed tamper-resistant member, when mounted perpendicularly on the closing face 16 can prevent insertion of objects through the door jamb 5.

With reference to FIG. 6, the tamper-resistant member 501 is an elongated member having one edge configured with the plurality of teeth 591. Tamper-resistant member 501*a* is mounted such that the saw-tooth edge extends away from the stop 8, and tamper-resistant member 501*b* is mounted such that the saw-tooth edge extends away from the door closing face 16. Further, the tamper-resistant members 501*a, b* are mounted such that there is an offset between the two when the door is in the closed position, the offset being parallel to the surface of the stop 8. The respective saw-tooth edges extend passed one another, as illustrated in FIG. 7, so that anything that may be inserted into the gap between the door and the frame proximal to the latch/lock bolt 11 will be subject to a sheer force when the door is closed. Additionally, the saw-tooth edges shred material of anything that is inserted in such a manner.

FIG. 7 depicts a top plan view of the locking assembly illustrated in FIGS. 5 and 6. The wall 2 is coupled to the door 3 via a bolt 11, which received by the opening 14 in the door 3. Attached to the stop 8 is the tamper-resistant metal strip 501*a*. Further, attached to the closing face 16 of the door 3 is the tamper-resistant metal strip 501*b*. The metal strips 510*a*, 501*b* mitigate the chance of an individual can insert an object between the stop 8 and the door 3 and actuate the bolt 11 to unlock the door 3.

It will be appreciated that while the tamper-resistant features 501 of this assembly are illustrated showing the locking mechanism housed in the wall 2 adjacent the frame 5, such that the latch/lock bolt 11 is extended to be received by the receiver opening 14 in the door, the locking mechanism may, alternatively be housed within the door such that the latch/lock bolt is extended toward a receiver opening defined in the door frame 5. In other words, the tamper-resistant features 501 may be provided irrespective of the locking mechanism configuration as long as they are installed proximal to the latch/lock bolt and receiver opening 14 as described above.

Moreover, it will be understood that tamper-resistant features 501 may be mounted the corresponding surfaces of the housing assemblies 201, 203 (See FIG. 2A, 2B: 213, 221) described above. Also, tamper-resistant features 501 may be installed in existing doors/door frames as a retro-fit.

Figure 8A:
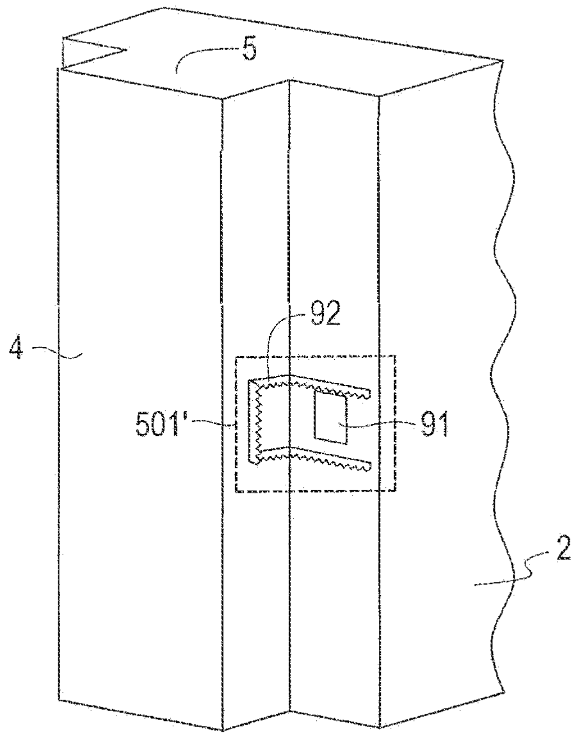
FIG. 8A depicts an exemplary door frame of another embodiment of a tamper-resistant locking system in accordance with an embodiment of the present disclosure.

FIGS. 8A through 10 depict another embodiment of the present disclosure. FIG. 8A depicts the cell wall 2 and the door jamb 5, which has a soffit 4. This structure is similar to the structure described hereinabove with reference to other embodiments. Coupled to the cell wall is a tamper-resistant feature 501'. The tamper-resistant feature 501' comprises a set of teeth 92, similar to saw teeth, which are described further with reference to FIG. 8B. In addition, the tamper-resistant feature 501' comprises an opening 91 through which a latch or bolt (not shown) may be actuated to lock a door, as described with reference to FIG. 9.

Figure 8B:
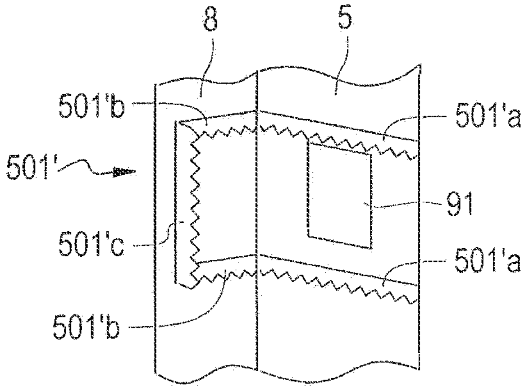
FIG. 8B is a detailed view of the tamper-resistant locking system depicted in FIG. 8A.

With reference to FIG. 8B, the tamper-resistant feature 501' comprises an opening 91 and saw-tooth members 501'*a*-501'*c*, which surround the opening 91. The saw-tooth members 501'*a* are mounted in parallel on the door jamb 5 horizontally above and below the opening 91 such that the saw-tooth edges extend toward the doorway. In this regard, the saw-tooth edges project outwardly away from the doorjamb 5. Additionally, the saw-tooth members 501'*b* are mounted horizontally and in parallel on the stop 8 with the saw-tooth edges extending perpendicularly outward from the stop 8 surface with respective ends abutting or adjacent those of the first pair 501'*a*. In addition, the vertical saw-tooth member 501'*c* is mounted on the stop 8, with its saw-tooth edge extending perpendicularly away from the surface of the stop 8 and its opposing ends terminating abutting or adjacent to the inward ends of the members 501'*b*.

Figure 9A:
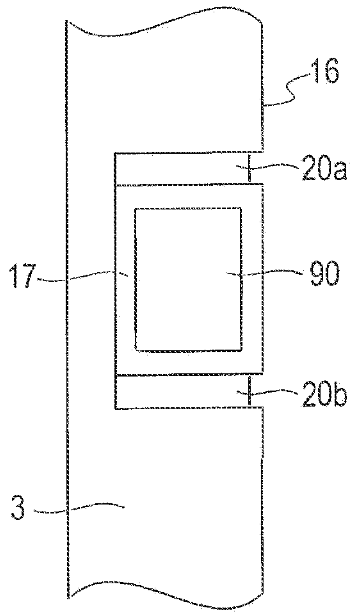
FIG. 9A is an exemplary door with a strike plate according to another embodiment of a tamper-resistant locking system.

FIG. 9A depicts a door 3 that is adapted and arranged to receive and engage the tamper-resistant feature 501' and the latch or bolt when protruding from the opening 91 (FIGS. 8A and 8B). In this regard, the door 3 comprises an opening 90 for receiving and engaging the latch or bolt (not shown) protruding from the opening 91. Additionally, the door 3 comprises two parallel channels 20*a* and 2*b* above and below the opening 90 for receiving and retaining the saw-tooth members 501'*a*. In one embodiment, with reference to FIG. 9B, the door further comprises a u-shaped channel 20*c* for receiving the saw-tooth members 501'*b* and 501'*c*.

Figure 9B:
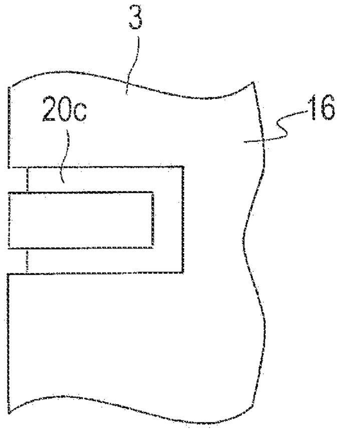
FIG. 9B is a view of the exemplary inside surface of a door in accordance with the tamper-resistant locking system of FIG. 9A.
Figure 10:
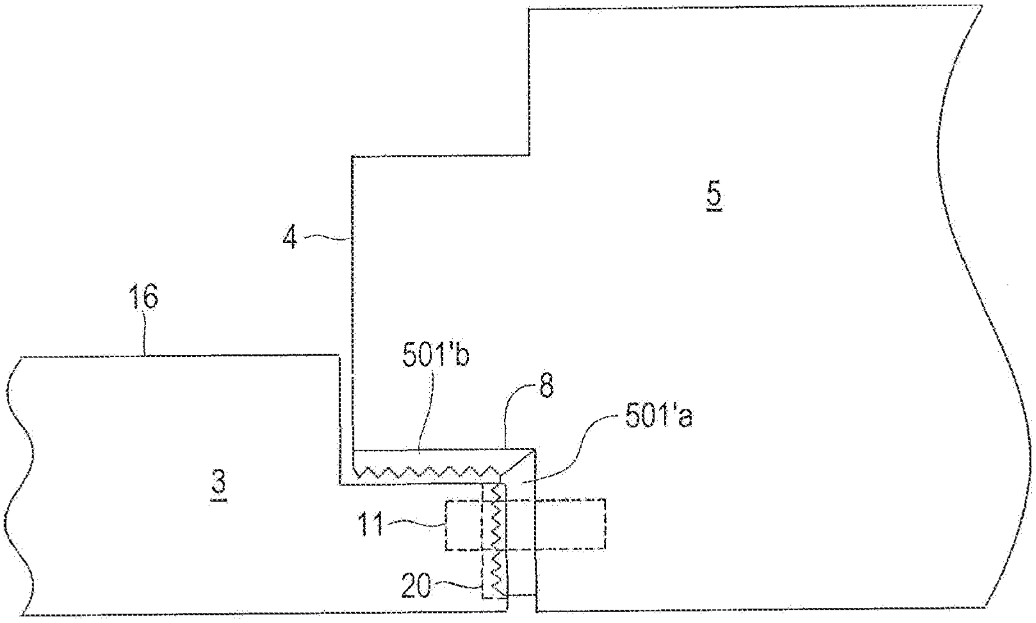
FIG. 10 is a plan view from above the door and frame with the door closed according to the embodiment of the tamper-resistant locking system shown in FIGS. 8A, 8B, and 9.

FIG. 10 depicts when the door 3 is in the closed position. In this regard, the tamper-resistant members 501'*a* are received in the channels 20. It will be appreciated that channels may be defined in the door closing face 16 to receive the tamper-resistant members 501'*b, c* extending from the stop 8, as is shown in FIG. 9B. It will also be appreciated that tamper-resistant feature 501' may be mounted to the door 3 and the channels defined in the appropriate positions on the door frame 5 and stop 8. Again, the tamper-resistant feature 501' may be mounted on the corresponding surfaces (FIG. 2A: 211, 213) of the housing 201 (FIG. 2A) described above and the channels defined in the appropriate positions on surface 217 (FIG. 2A) of housing 203 (FIG. 2A).

Figure 11A:
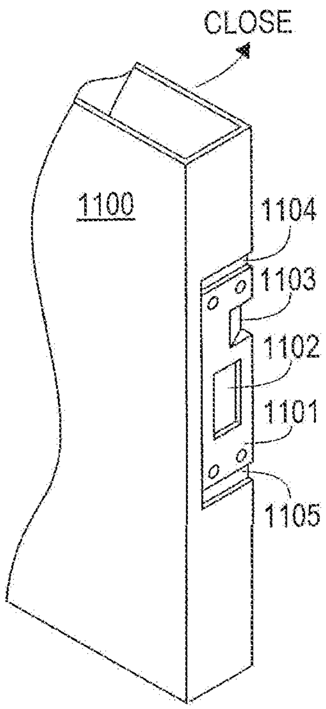
FIG. 11A is a perspective view of another embodiment of a door of a tamper-resistant locking system in accordance with the present disclosure.
Figure 11B:
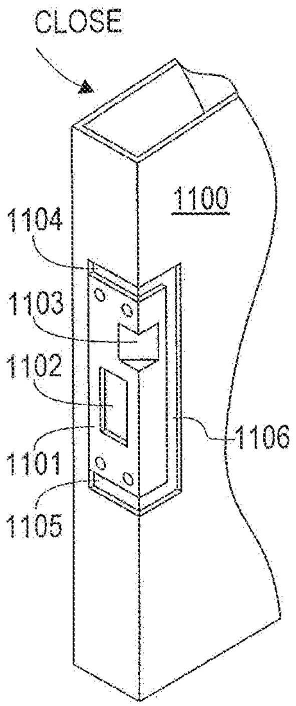
FIG. 11B is another perspective view of the door of the tamper-resistant locking system of FIG. 11A.
Figure 11C:
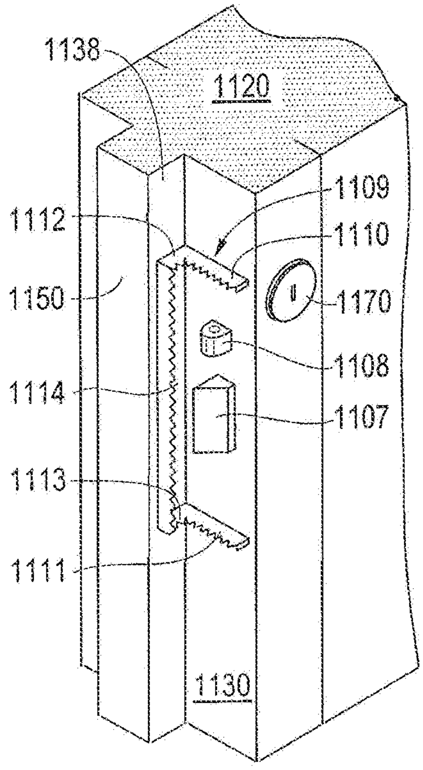
FIG. 11C is a perspective view of another embodiment of a door jamb of the tamper-resistant locking system depicted in FIGS. 11A and 11B.

FIGS. 11A-11C depict another embodiment of a tamper-resistant locking system in accordance with an embodiment of the present disclosure. FIGS. 11A and 11B are perspective views of a door 1100 having a portion of the tamper-resistant locking system of the present disclosure. Further, FIG. 11C is a perspective view of a wall portion of the tamper-resistant locking system.

In this regard, FIG. 11A depicts a strike plate 1101 installed on the door 1100. In the door are openings 1102 and 1103, which are described further with reference to FIG. 11C. Running parallel and both above and below the strike plate 1101 are channels 1104 and 1105. Note that the channels 1104 and 1105 may be formed (e.g., carved) within the door 1100 or may be created with a metal material and installed in the door 1100.

FIG. 11B depicts another perspective view of the portion of the locking system installed on the door 1100. FIG. 11B depicts the strike plate 1101 having openings 1102 and 1103. Additionally, FIG. 11B depicts the channels 1104 and 1105, as described hereinabove with reference to FIG. 11A. Further shown is a U-shaped channel 1106 that is contiguous with the channels 1104 and 1105.

FIG. 11C is a perspective view of a wall 1120 having a portion of the tamper-resistant locking system of the present disclosure corresponding to the door portion shown in FIGS. 11A and 11B. With reference to FIG. 11C, a lock 1170 installed in a door jamb 1150 is coupled to a wall 1120. When the lock 1170 is actuated, the lock bolt 1107 and the roller bolt 1108 protrude into the openings 1102 and 1103 (FIGS. 11A and 11B), respectively.

The embodiment shown depicts a tamper-resistant mechanism 1109 that comprises two parallel and horizontal members 1110 an 1111 that run above and below the lock bolt 1107 and the roller bolt 1108. In addition, the tamper-resistant mechanism 1109 comprises two parallel and horizontal members 1112 and 1113 that are contiguous with the members 1110 and 1111 at a corner between a shoulder 1130 and a stop 1138 of the door jamb 1150. The members 1112 and 1113 run along the stop 1138 and are contiguous with a vertical member 1114. The In operation, when the door 1100 is closed, the saw-tooth members 1110 and 1111 fit within the channels 1104 and 1105, respectively. In addition, the saw-tooth members 1112, 1113, and 1114 fit within the U-shaped channel 1106. Because the saw-tooth members 1110-1114 fit within the channels 1104-1106, the chance of an individual gaining access to the lock bolt 1107 and the roller bolt 1108 is mitigated.

Note that the saw-tooth members 1110-1114 are narrow strips of a durable material having saw-tooth or any type of irregular edge. In one embodiment, the narrow strips may be made of a metallic material, such as steel. The strips may be other types of durable material known in the art or future-developed that could withstand being prodded with an object through a narrow passage way between the doorjamb 1150 and the door 1100.

Figure 12A:
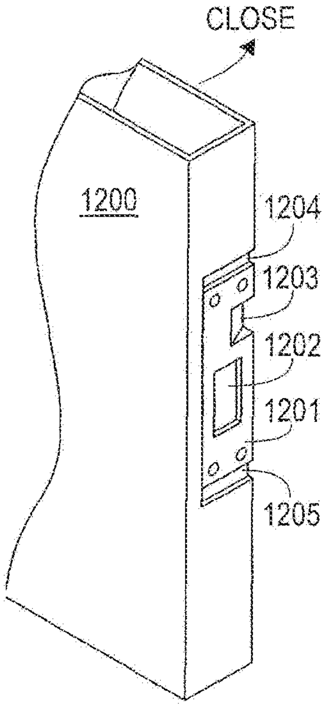
FIG. 12A is a perspective view of another embodiment of a door of a tamper-resistant locking system in accordance with the present disclosure.
Figure 12B:
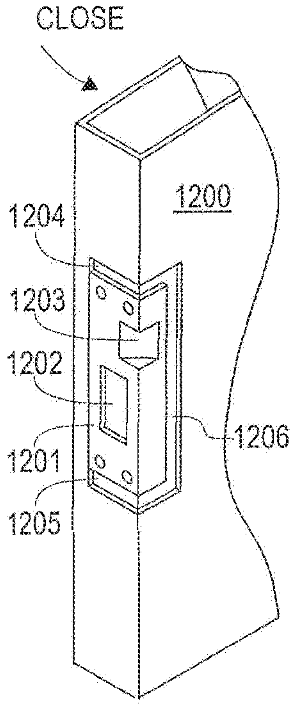
FIG. 12B is another perspective view of the door of the tamper-resistant locking system of FIG. 12A.
Figure 12C:
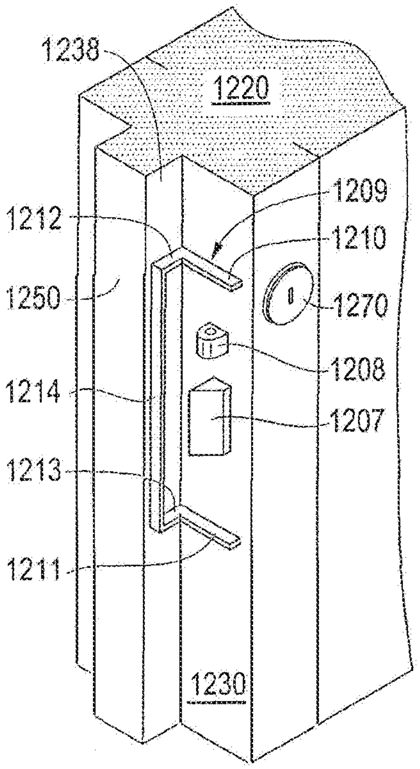
FIG. 12C is a perspective view of another embodiment of a door jamb of the tamper-resistant locking system depicted in FIGS. 12A and 12B.

FIGS. 12A-12C depict another embodiment of a tamper-resistant locking system in accordance with an embodiment of the present disclosure. This embodiment is substantially similar to the embodiment described in FIGS. 11A-11C. FIGS. 12A and 12B are perspective views of a door 1200 having a portion of the tamper-resistant locking system of the present disclosure. Further, FIG. 12C is a perspective view of a wall portion of the tamper-resistant locking system.

In this regard, FIG. 12A depicts a strike plate 1201 installed on the door 1200. In the door are openings 1202 and 1203, which are described further with reference to FIG. 12C. Running parallel and both above and below the strike plate 1201 are channels 1204 and 1205. Note that the channels 1204 and 1205 may be formed (e.g., carved) within the door 1200 or may be created with a metal material and installed in the door 1100.

FIG. 12B depicts another perspective view of the portion of the locking system installed on the door 1200. FIG. 12B depicts the strike plate 1201 having openings 1202 and 1203. Additionally, FIG. 12B depicts the channels 1204 and 1205, as described hereinabove with reference to FIG. 12A. Further shown is a U-shaped channel 1206 that is contiguous with the channels 1204 and 1205.

FIG. 12C is a perspective view of a wall 1220 having a portion of the tamper-resistant locking system of the present disclosure corresponding to the door portion shown in FIGS. 12A and 12B. With reference to FIG. 12C, a lock 1270 installed in a door jamb 1250 is coupled to a wall 1220. When the lock 1270 is actuated, the lock bolt 1207 and the roller bolt 1208 protrude into the openings 1202 and 1203 (FIGS. 12A and 1213), respectively.

The embodiment shown depicts a tamper-resistant mechanism 1209 that comprises two parallel and horizontal members 1210 an 1211 that run above and below the lock bolt 1207 and the roller bolt 1208. In addition, the tamper-resistant mechanism 1209 comprises two parallel and horizontal members 1212 and 1213 that are contiguous with the members 1210 and 1211 at a corner between a shoulder 1230 and a stop 1238 of the door jamb 1250. The members 1212 and 1213 run along the stop 1238 and are contiguous with a vertical member 1214.

In operation, when the door 1200 is closed, the members 1210 and 1211 fit within the channels 1204 and 1205, respectively. In addition, the members 1212, 1213, and 1214 fit within the U-shaped channel 1206. Because the members 1210-1214 fit within the channels 1204-1206, the chance of an individual gaining access to the lock bolt 1207 and the roller bolt 1208 is mitigated.

Note that the saw-tooth members 1210-1214 are narrow strips of a durable material having smooth or any type of regular edge. In one embodiment, the narrow strips may be made of a metallic material, such as steel. The strips may be other types of durable material known in the art or future-developed that could withstand being prodded with an object through a narrow passage way between the doorjamb 1150 and the door 1100.

Figure 13A:
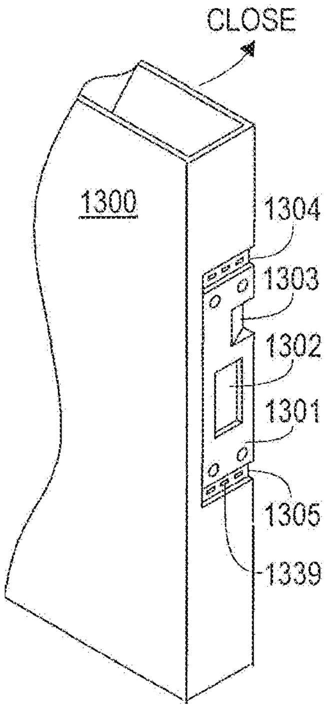
FIG. 13A is a perspective view of another embodiment of a door of a tamper-resistant locking system in accordance with the present disclosure.
Figure 13B:
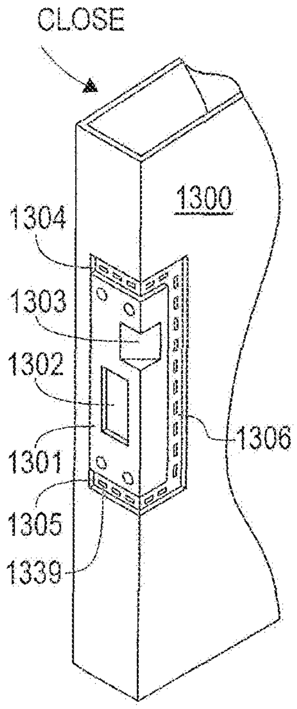
FIG. 13B is another perspective view of the door of the tamper-resistant locking system of FIG. 13A.
Figure 13C:
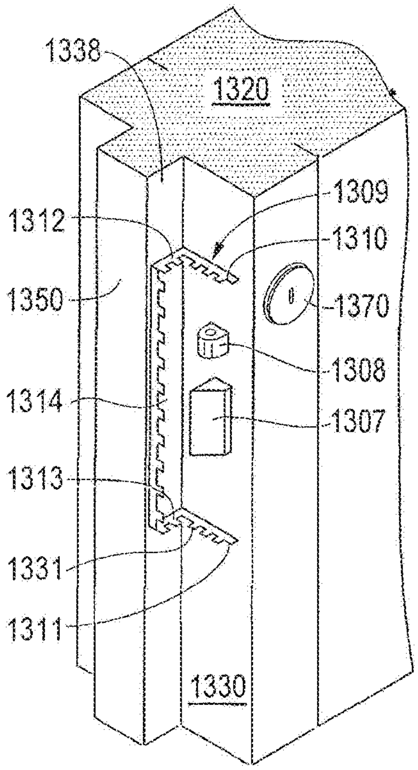
FIG. 13C is a perspective view of another embodiment of a door jamb of the tamper-resistant locking system depicted in FIGS. 13A and 13B.

FIGS. 13A-13C depict another embodiment of a tamper-resistant locking system in accordance with an embodiment of the present disclosure. This embodiment is substantially similar to the embodiment described in FIGS. 11A-11C. and FIGS. 12A-12C. FIGS. 13A and 13B are perspective views of a door 1300 having a portion of the tamper-resistant locking system of the present disclosure. Further, FIG. 13C is a perspective view of a wall portion of the tamper-resistant locking system.

In this regard, FIG. 13A depicts a strike plate 1301 installed on the door 1300. In the door are openings 1302 and 1303, which are described further with reference to FIG. 13C. Running parallel and both above and below the strike plate 1301 are channels 1304 and 1305. Note that the channels 1304 and 1305 may be formed (e.g., carved) within the door 1300 or may be created with a metal material and installed in the door 1100.

FIG. 13B depicts another perspective view of the portion of the locking system installed on the door 1300. FIG. 13B depicts the strike plate 1301 having openings 1302 and 1303. Additionally, FIG. 13B depicts the channels 1304 and 1305, as described hereinabove with reference to FIG. 13A. Further shown is a U-shaped channel 1306 that is contiguous with the channels 1304 and 1305. Note that in this embodiment, the channels 1304-1306 comprise square shaped openings 1331. This will be discussed further with reference to FIG. 13C.

FIG. 13C is a perspective view of a wall 1320 having a portion of the tamper-resistant locking system of the present disclosure corresponding to the door portion shown in FIGS. 13A and 13B. With reference to FIG. 13C, a lock 1370 installed in a doorjamb 1350 is coupled to a wall 1320. When the lock 1370 is actuated, the lock bolt 1307 and the roller bolt 1308 protrude into the openings 1302 and 1303 (FIGS. 13A and 13B), respectively.

The embodiment shown depicts a tamper-resistant mechanism 1309 that comprises two parallel and horizontal square-tooth members 1310 an 1311 that run above and below the lock bolt 1307 and the roller bolt 1308. In addition, the tamper-resistant mechanism 1209 comprises two parallel and horizontal square-tooth members 1312 and 1313 that are contiguous with the members 1310 and 1311 at a corner between a shoulder 1330 and a stop 1338 of the door jamb 1350. The square tooth members 1312 and 1313 run along the stop 1338 and are contiguous with a vertical member 1314. Note that the square-tooth members 1310-1314 comprise a plurality of pin-shaped protrusions 1331 that mate with corresponding square tooth shaped openings 1339 in the channels 1304-1306.

In operation, when the door 1300 is closed, the members 1310 and 1311 fit within the channels 1304 and 1305, respectively. In addition, the members 1312, 1313, and 1314 fit within the U-shaped channel 1306. Note that in this embodiment, when the door is closed, the pin-shaped protrusions 1331 mate with the pin-shaped openings 1339. Because the members 1310-1314 fit within the channels 1304-1306 and the pin-shaped protrusions 1331 mate with the pin-shaped openings, the chance of an individual gaining access to the lock bolt 1307 and the roller bolt 1308 is mitigated.

Note that the members 1310-1314 are narrow strips of a durable material having irregular square-tooth protrusions that extend from the strip or any type of irregular edge. In one embodiment, the narrow strips may be made of a metallic material, such as steel. The strips may be other types of durable material known in the art or future-developed that could withstand being prodded with an object through a narrow passage way between the door jamb 1350 and the door 1300.

Figure 14A:
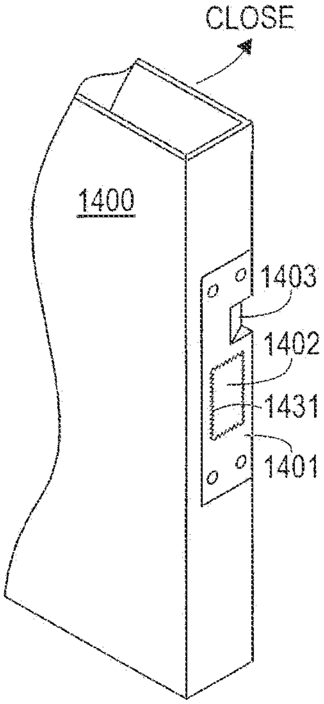
FIG. 14A is a perspective view of another embodiment of a door of a tamper-resistant locking system in accordance with the present disclosure.
Figure 14B:
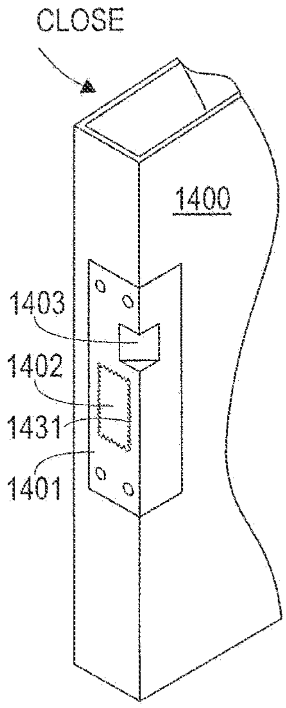
FIG. 14B is another perspective view of the door of the tamper-resistant locking system of FIG. 14A.
Figure 14C:
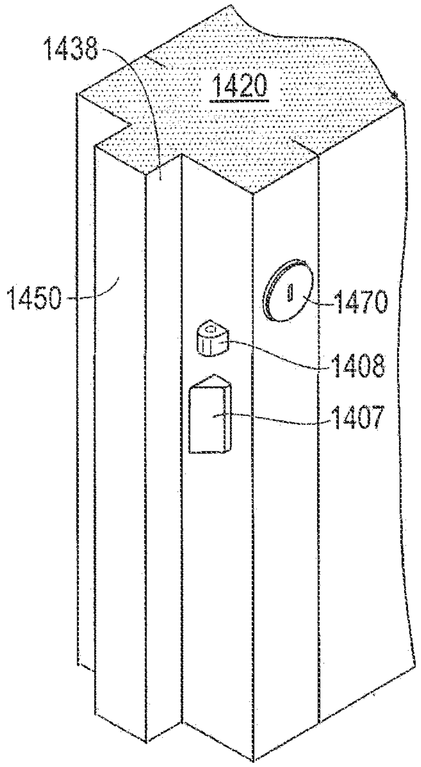
FIG. 14C is a perspective view of another embodiment of a door jamb of the tamper-resistant locking system depicted in FIGS. 14A and 14B.

FIGS. 14A-14C depict another embodiment of a tamper-resistant locking system in accordance with an embodiment of the present disclosure. FIGS. 14A and 14B are perspective views of a door 1300 having a portion of the tamper-resistant locking system of the present disclosure. Further, FIG. 14C is a perspective view of a wall portion of the tamper-resistant locking system.

In this regard, FIG. 14A depicts a strike plate 1401 installed on the door 1400. In the door are openings 1402 and 1403, which are described further with reference to FIG. 14C. In the embodiment depicted, the opening 1402 comprises a plurality of saw-tooth protrusions 1431 about its periphery. FIG. 14B depicts another perspective view of the portion of the locking system installed on the door 1400. FIG. 14B depicts the strike plate 1401 having openings 1402 and 1403. FIG. 14B further shows the saw-tooth protrusions about the periphery of opening 1402.

FIG. 14C is a perspective view of a wall 1420 having a portion of the tamper-resistant locking system of the present disclosure corresponding to the door portion shown in FIGS. 14A and 14B. With reference to FIG. 14C, a lock 1470 installed in a door jamb 1450 is coupled to a wall 1420. When the lock 1470 is actuated, the lock bolt 1407 and the roller bolt 1408 protrude into the openings 1402 and 1403 (FIGS. 14A and 14B), respectively.

In operation, when the door 1400 is closed, saw-tooth protrusions 1431 around the periphery of the opening 1402 frictionally interact with the lock bolt 1407. This frictional interaction mitigates the chance of an individual gaining access to the lock bolt 1407 and the roller bolt 1408.

Figures 15A, 15B, 15C:
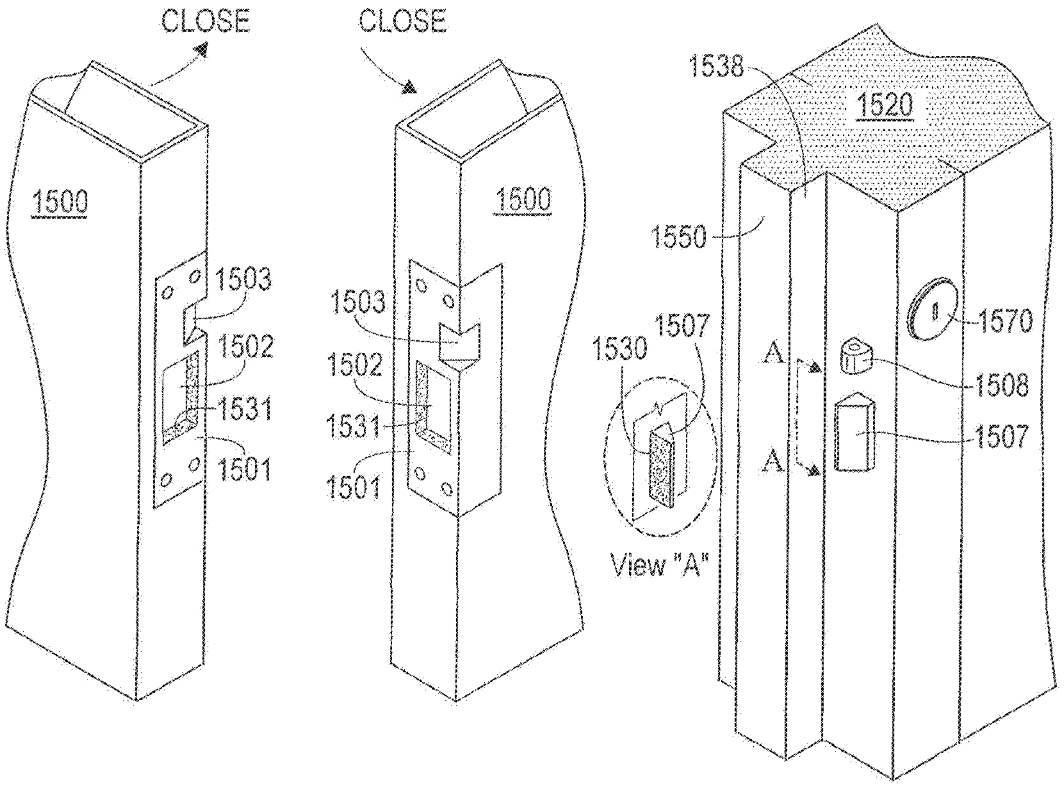
FIG. 15A is a perspective view of another embodiment of a door of a tamper-resistant locking system in accordance with the present disclosure.
FIG. 15B is another perspective view of the door of the tamper-resistant locking system of FIG. 15A.
FIG. 15C is a perspective view of another embodiment of a door jamb of the tamper-resistant locking system depicted in FIGS. 15A and 15B.

FIGS. 15A-15C depict another embodiment of a tamper-resistant locking system in accordance with an embodiment of the present disclosure. FIGS. 15A and 15B are perspective views of a door 1500 having a portion of the tamper-resistant locking system of the present disclosure. Further, FIG. 15C is a perspective view of a wall portion of the tamper-resistant locking system.

In this regard, FIG. 15A depicts a strike plate 1501 installed on the door 1500. In the door are openings 1502 and 1503, which are described further with reference to FIG. 15C. In the embodiment depicted, the opening 1502 comprises one or more inside faces 1531 that comprise a texture. FIG. 15B depicts another perspective view of the portion of the locking system installed on the door 1500. FIG. 15B depicts the strike plate 1501 having openings 1502 and 1503. FIG. 15B further shows the textured face 1531 of the opening 1502.

FIG. 15C is a perspective view of a wall 1520 having a portion of the tamper-resistant locking system of the present disclosure corresponding to the door portion shown in FIGS. 15A and 15B. With reference to FIG. 15C, a lock 1570 installed in a door jamb 1550 is coupled to a wall 1520. When the lock 1570 is actuated, the lock bolt 1507 and the roller bolt 1508 protrude into the openings 1502 and 1503 (FIGS. 15A and 15B), respectively.

In addition, the lock bolt 1507 has a textured face. The textured face is shown in "View" A of FIG. 15C. In operation, when the door 1500 is closed, the textured face 1530 of the bolt 1507 frictionally interacts with the textured face 1531 (FIG. 15A). This frictional interaction mitigates the chance of an individual gaining access to the lock bolt 1507 and the roller bolt 1508.

Figure 16A:
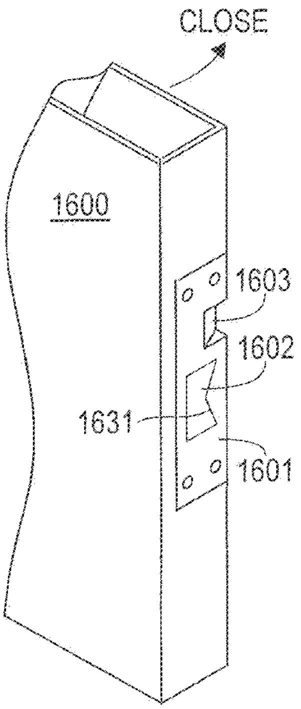
FIG. 16A is a perspective view of another embodiment of a door of a tamper-resistant locking system in accordance with the present disclosure.
Figure 16B:
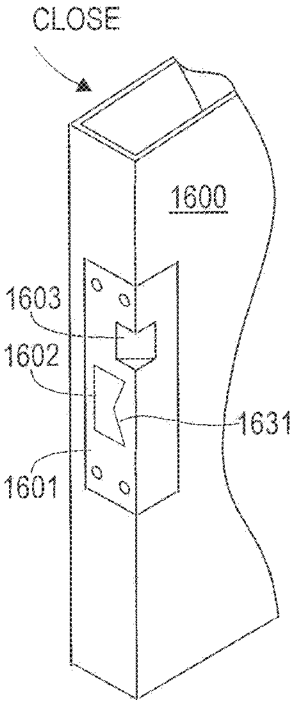
FIG. 16B is another perspective view of the door of the tamper-resistant locking system of FIG. 16A.
Figure 16C:
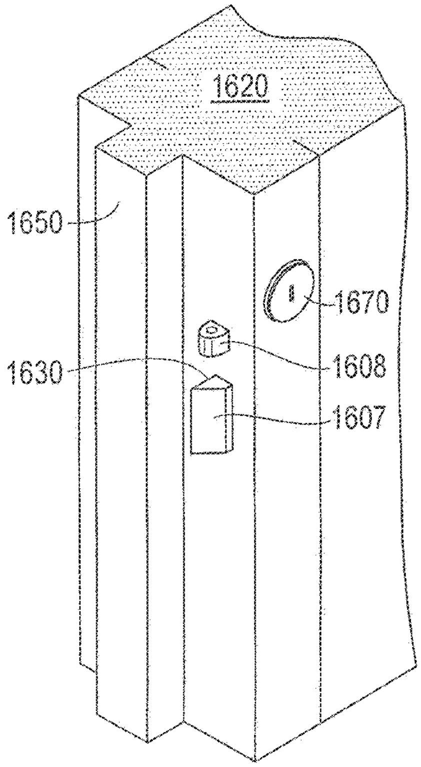
FIG. 16C is a perspective view of another embodiment of a door jamb of the tamper-resistant locking system depicted in FIGS. 16A and 16B.

FIGS. 16A-16C depict another embodiment of a tamper-resistant locking system in accordance with an embodiment of the present disclosure. FIGS. 16A and 16B are perspective views of a door 1600 having a portion of the tamper-resistant locking system of the present disclosure. Further, FIG. 16C is a perspective view of a wall portion of the tamper-resistant locking system.

In this regard, FIG. 16A depicts a strike plate 1601 installed on the door 1600. In the door are openings 1602 and 1603, which are described further with reference to FIG. 16C. In the embodiment depicted, the opening 1602 comprises one or more tapered periphery 1631. In one embodiment, the tapered periphery 1631 part of the strike plate 1601, i.e., an extension and/or cut out of the strike plate 1601. FIG. 16B depicts another perspective view of the portion of the locking system installed on the door 1600. FIG. 16B depicts the strike plate 1601 having openings 1602 and 1603. FIG. 16B further shows the tapered periphery 1631. Note that the taper may also be an extension of one of the faces of the opening.

FIG. 16C is a perspective view of a wall 1620 having a portion of the tamper-resistant locking system of the present disclosure corresponding to the door portion shown in FIGS. 16A and 16B. With reference to FIG. 16C, a lock 1670 installed in a door jamb 1650 is coupled to a wall 1620. When the lock 1670 is actuated, the lock bolt 1607 and the roller bolt 1608 protrude into the openings 1602 and 1603 (FIGS. 16A and 16B), respectively.

In operation, when the door 1600 is closed, a portion of the bolt 1507, e.g., side 1630 of the bolt, frictionally interacts with the tapered periphery 1631 (FIG. 16A). This frictional interaction mitigates the chance of an individual gaining access to the lock bolt 1607 and the roller bolt 1608.

Figure 17A:
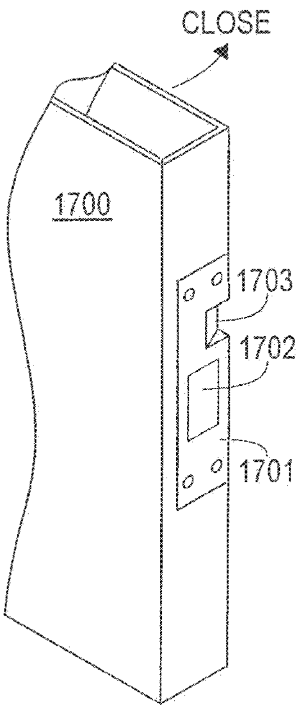
FIG. 17A is a perspective view of another embodiment of a door of a tamper-resistant locking system in accordance with the present disclosure.
Figure 17B:
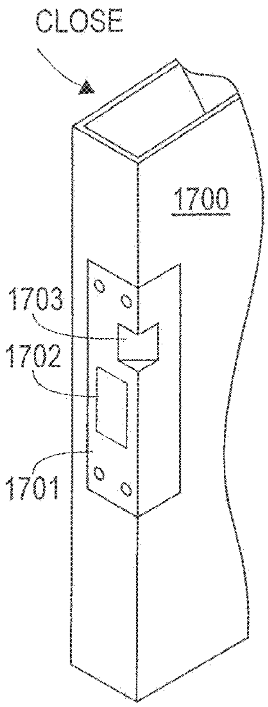
FIG. 17B is another perspective view of the door of the tamper-resistant locking system of FIG. 17A.
Figure 17C:
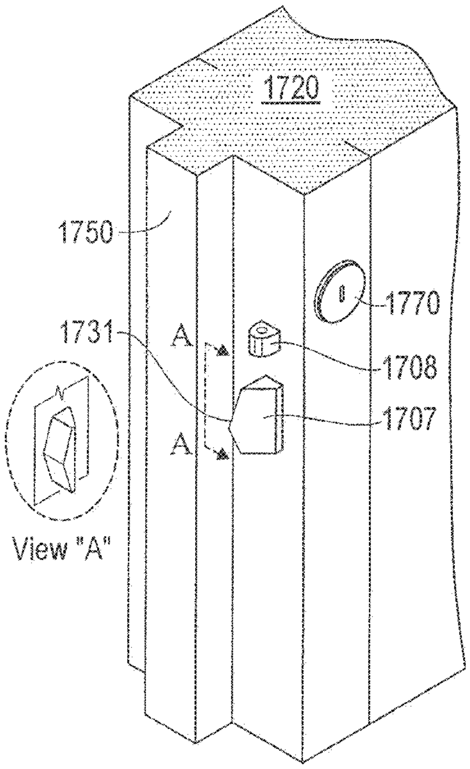
FIG. 17C is a perspective view of another embodiment of a door jamb of the tamper-resistant locking system depicted in FIGS. 17A and 17B.

FIGS. 17A-17C depict another embodiment of a tamper-resistant locking system in accordance with an embodiment of the present disclosure. FIGS. 17A and 17B are perspective views of a door 1700 having a portion of the tamper-resistant locking system of the present disclosure. Further, FIG. 17C is a perspective view of a wall portion of the tamper-resistant locking system.

In this regard, FIG. 17A depicts a strike plate 1701 installed on the door 1700. In the door are openings 1702 and 1703, which are described further with reference to FIG. 16C. FIG. 17B depicts another perspective view of the portion of the locking system installed on the door 1700. FIG. 17B depicts the strike plate 1701 having openings 1702 and 1703.

FIG. 17C is a perspective view of a wall 1720 having a portion of the tamper-resistant locking system of the present disclosure corresponding to the door portion shown in FIGS. 17A and 17B. With reference to FIG. 17C, a lock 1770 installed in a doorjamb 1750 is coupled to a wall 1720. When the lock 1770 is actuated, the lock bolt 1707 and the roller bolt 1708 protrude into the openings 1702 and 1703 (FIGS. 17A and 17B), respectively. Note that in this embodiment, the lock bolt 1707 comprises a taped face 1731.

In operation, when the door 1700 is closed, a portion of the bolt 1707, i.e., side 1731 of the bolt, frictionally interacts with the opening 1702 (FIG. 17A). This frictional interaction mitigates the chance of an individual gaining access to the lock bolt 1707 and the roller bolt 1708.

Figure 18A:
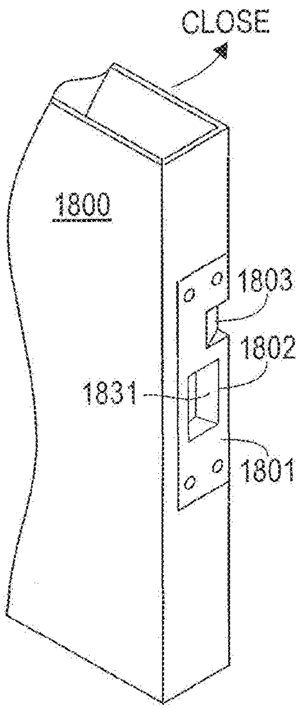
FIG. 18A is a perspective view of another embodiment of a door of a tamper-resistant locking system in accordance with the present disclosure.
Figure 18B:
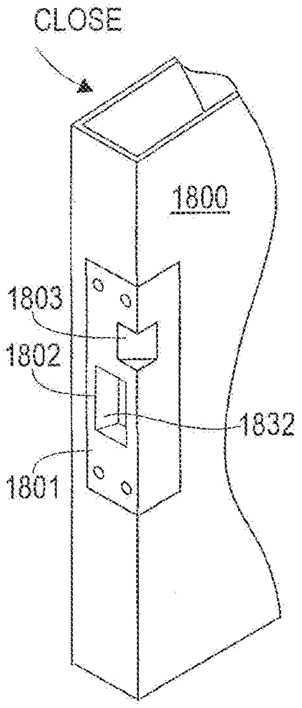
FIG. 18B is another perspective view of the door of the tamper-resistant locking system of FIG. 18A.
Figure 18C:
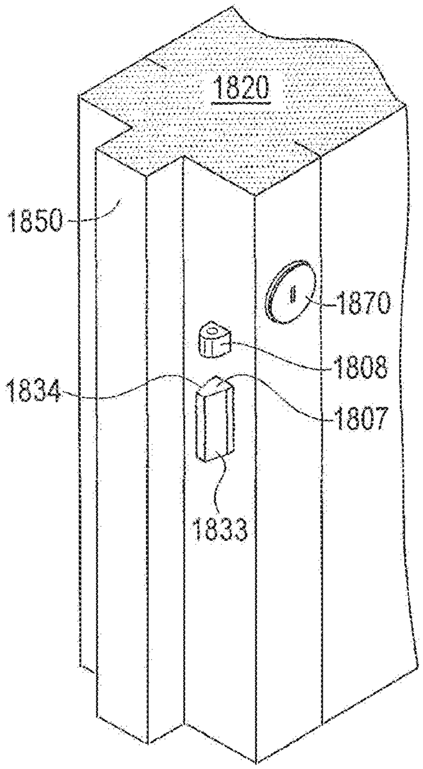
FIG. 18C is a perspective view of another embodiment of a door jamb of the tamper-resistant locking system depicted in FIGS. 18A and 18B.

FIGS. 18A-18C depict another embodiment of a tamper-resistant locking system in accordance with an embodiment of the present disclosure. FIGS. 18A and 18B are perspective views of a door 1800 having a portion of the tamper-resistant locking system of the present disclosure. Further, FIG. 18C is a perspective view of a wall portion of the tamper-resistant locking system.

In this regard, FIG. 18A depicts a strike plate 1801 installed on the door 1800. In the door are openings 1802 and 1803, which are described further with reference to FIG. 18C. In the embodiment depicted, the opening 1802 has two tapered inside walls 1830 (FIG. 18A) and 1832 (FIG. 18B). FIG. 18B depicts another perspective view of the portion of the locking system installed on the door 1800. FIG. 18B further shows the tapered inside wall 1832.

FIG. 18C is a perspective view of a wall 1820 having a portion of the tamper-resistant locking system of the present disclosure corresponding to the door portion shown in FIGS. 18A and 18B. With reference to FIG. 18C, a lock 1870 installed in a door jamb 1850 is coupled to a wall 1820. When the lock 1870 is actuated, the lock bolt 1807 and the roller bolt 1808 protrude into the openings 1802 and 1803 (FIGS. 18A and 18B), respectively. Note that in this embodiment, the lock bolt 1707 comprises two tapered faces 1833 and 1834.

In operation, when the door 1700 is closed, the tapered faces 1833 and 1834 frictionally match the tapered faces 1831 (FIG. 18A) and 1832 (FIG. 18B) of the opening 1802 (FIG. 18A). This frictional matching mitigates the chance of an individual being able to access the bolt 1807 and undesirably opening the door 1800.

Figures 19A, 19B, 19C:
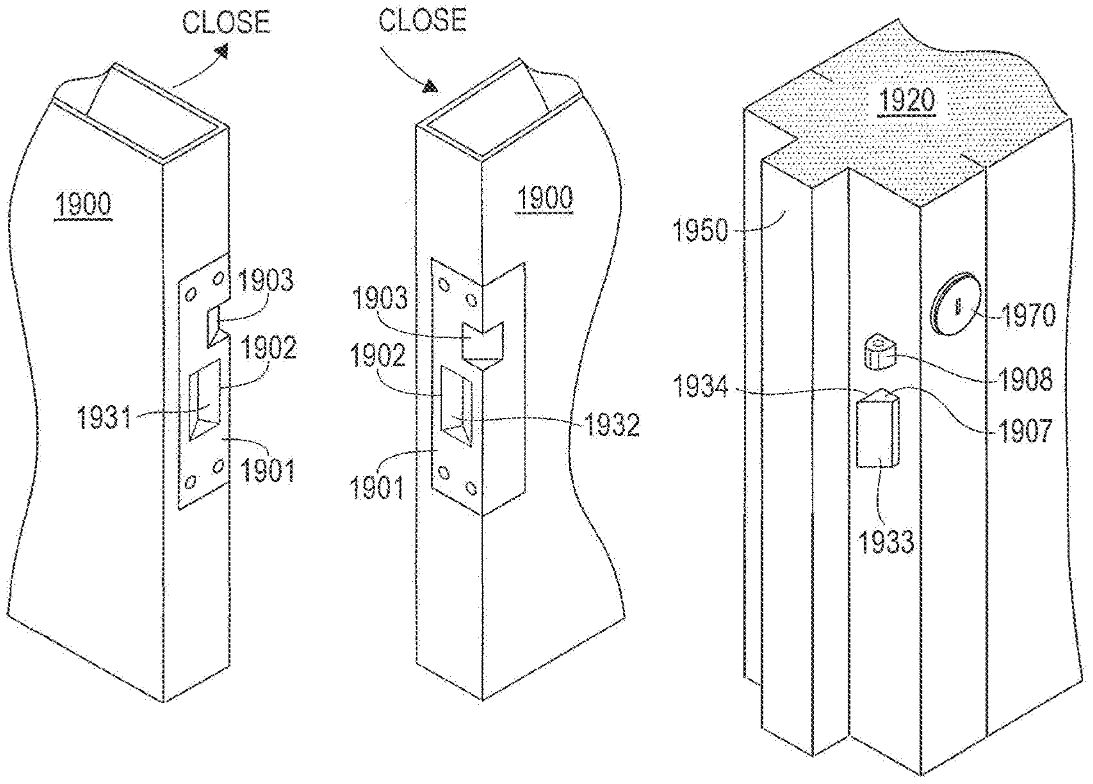
FIG. 19A is a perspective view of another embodiment of a door of a tamper-resistant locking system in accordance with the present disclosure.
FIG. 19B is another perspective view of the door of the tamper-resistant locking system of FIG. 19A.
FIG. 19C is a perspective view of another embodiment of a door jamb of the tamper-resistant locking system depicted in FIGS. 19A and 19B.

FIGS. 19A-19C depict another embodiment of a tamper-resistant locking system in accordance with an embodiment of the present disclosure. FIGS. 19A and 19B are perspective views of a door 1900 having a portion of the tamper-resistant locking system of the present disclosure. Further, FIG. 19C is a perspective view of a wall portion of the tamper-resistant locking system.

In this regard, FIG. 19A depicts a strike plate 1901 installed on the door 1900. In the door are openings 1902 and 1903, which are described further with reference to FIG. 19C. In the embodiment depicted, the opening 1902 has two tapered inside walls 1930 (FIG. 18A) and 1932 (FIG. 18B). Such tapered walls 1931 and 1932 are part of the strike 1901. In this regard, the tapered inside walls 1931 and 1932 are extensions of the strike. FIG. 19B depicts another perspective view of the portion of the locking system installed on the door 1900. FIG. 19B further shows the tapered inside wall 1932.

FIG. 19C is a perspective view of a wall 1920 having a portion of the tamper-resistant locking system of the present disclosure corresponding to the door portion shown in FIGS. 19A and 19B. With reference to FIG. 19C, a lock 1970 installed in a doorjamb 1950 is coupled to a wall 1920. When the lock 1970 is actuated, the lock bolt 1907 and the roller bolt 1908 protrude into the openings 1902 and 1803 (FIGS. 19A and 19B), respectively. Note that in this embodiment, the lock bolt 1907 comprises two tapered faces 1933 and 1934.

In operation, when the door 1900 is closed, the tapered faces 1933 and 1934 frictionally match the tapered faces 1931 (FIG. 19A) and 1932 (FIG. 19B) of the opening 1902 (FIG. 19A). This frictional matching mitigates the chance of an individual being able to access the bolt 1907 and undesirably opening the door 1900.

Figure 20A:
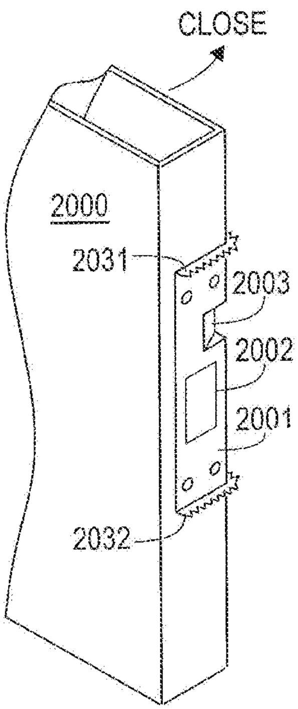
FIG. 20A is a perspective view of another embodiment of a door of a tamper-resistant locking system in accordance with the present disclosure.
Figure 20B:
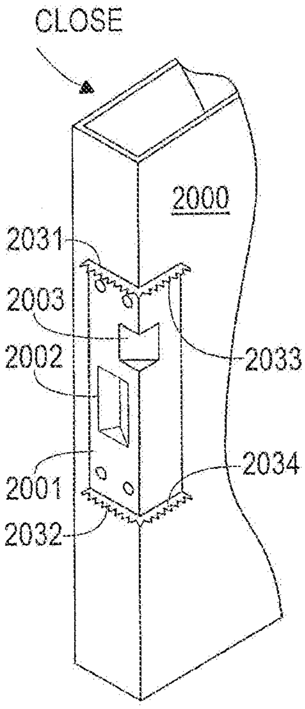
FIG. 20B is another perspective view of the door of the tamper-resistant locking system of FIG. 20A.
Figure 20C:
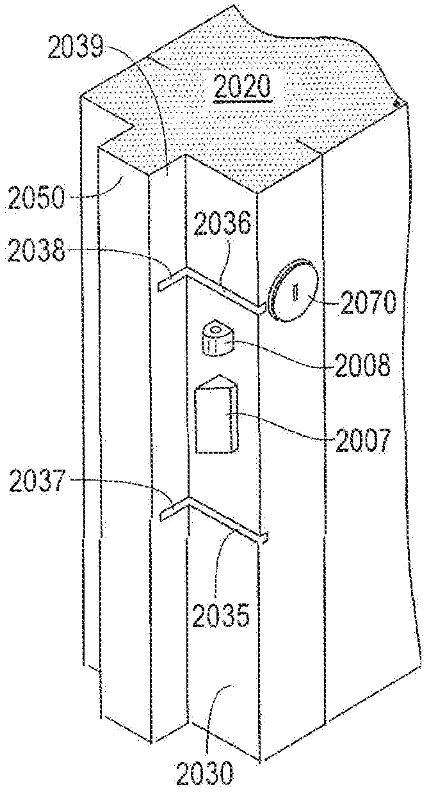
FIG. 20C is a perspective view of another embodiment of a door jamb of the tamper-resistant locking system depicted in FIGS. 20A and 20B.

FIGS. 20A-20C depict another embodiment of a tamper-resistant locking system in accordance with an embodiment of the present disclosure. FIGS. 20A and 20B are perspective views of a door 2000 having a portion of the tamper-resistant locking system of the present disclosure. Further, FIG. 20C is a perspective view of a wall portion of the tamper-resistant locking system.

In this regard, FIG. 20A depicts a strike plate 2001 installed on the door 2000. In the door are openings 2002 and 2003, which are described further with reference to FIG. 20C. Running parallel and both above and below the strike plate 2001 are saw-tooth strips 2032 and 2031. In one embodiment, the saw-tooth strips 2032 and 2031 are extensions of the strike plate 2001. In another embodiment, the saw-tooth strips 2032 and 2031 may be strips that are separate and apart from the strike plate 2001.

FIG. 20B depicts another perspective view of the portion of the locking system installed on the door 2000. FIG. 20B depicts the strike plate 2001 having openings 2002 and 2003. Additionally, FIG. 20B depicts the strips 2031 and 2032, as described hereinabove with reference to FIG. 20A. Further shown are two parallel saw-tooth strips 2033 and 2034 that are contiguous with saw-tooth strips 2031 and 2032, respectively. As noted hereinabove, the strips may be extensions of the strike plate 2001 or be separate and distinct structures.

FIG. 20C is a perspective view of a wall 2020 having a portion of the tamper-resistant locking system of the present disclosure corresponding to the door portion shown in FIGS. 20A and 20B. With reference to FIG. 20C, a lock 2070 installed in a door jamb 2050 is coupled to a wall 2020. When the lock 2070 is actuated, the lock bolt 2007 and the roller bolt 2008 protrude into the openings 2002 and 2003 (FIGS. 20A and 20B), respectively.

The embodiment shown depicts a tamper-resistant mechanism 2009 that comprises two parallel and horizontal channels 2035 and 2036 that run above and below the lock bolt 2007 and the roller bolt 2008. In addition, the tamper-resistant mechanism 2009 comprises two parallel and horizontal channels 2037 and 2038 that are contiguous with the members 2035 and 2036 at a corner between a shoulder 2030 and a stop 2039 of the doorjamb 2050.

In operation, when the door 2000 is closed, the strips 2031 and 2032 fit within the channels 2035 and 2036, respectively. In addition, the strips 2033 and 2034 fit within the channels 2037 and 2038. Note that in this embodiment, when the door is closed, the strips 2031-2034 fit snugly in the channels 2035-2038. Because the members 2031-2034 fit within the channels 2035-2038, the chance of an individual gaining access to the lock bolt 2007 and the roller bolt 2008 is mitigated.

Note that the members 2031-2034 are narrow strips of a durable material having irregular saw-tooth protrusions that extend from the strip or any type of irregular edge. In one embodiment, the narrow strips may be made of a metallic material, such as steel. The strips may be other types of durable material known in the art or future-developed that could withstand being prodded with an object through a narrow passage way between the door jamb 2050 and the door 2000.

Figures 21A, 21B, 21C:
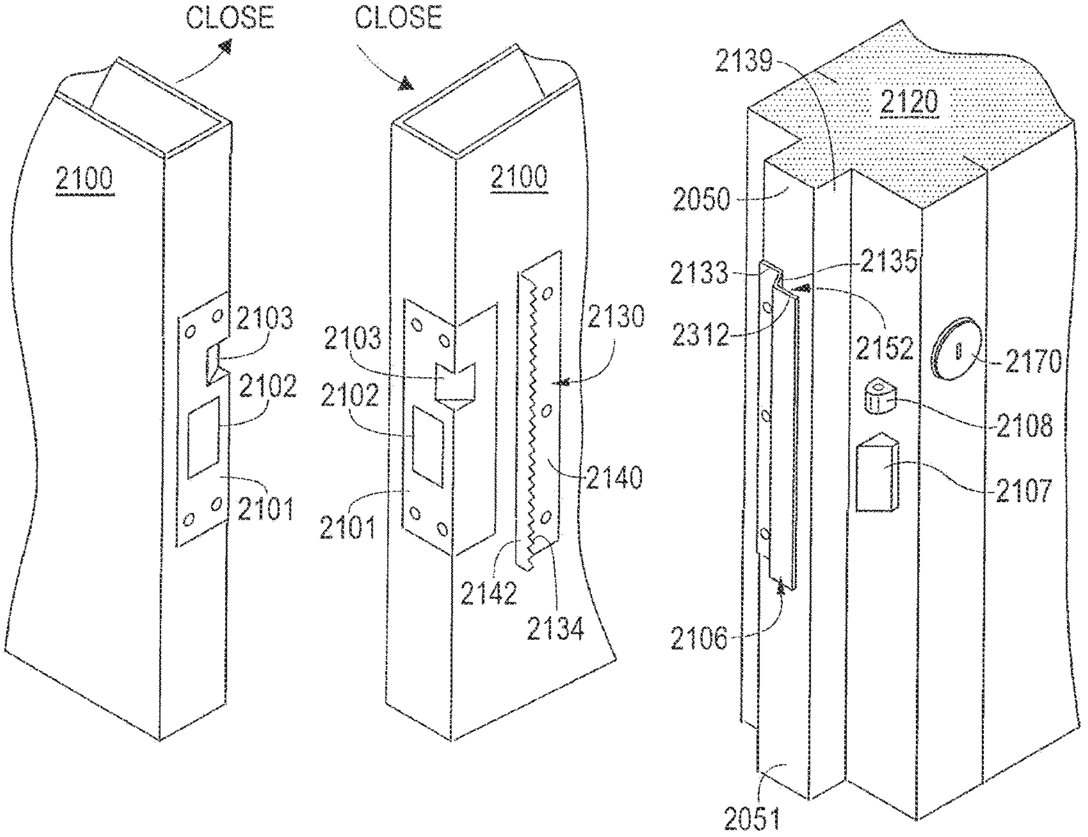
FIG. 21A is a perspective view of another embodiment of a door of a tamper-resistant locking system in accordance with the present disclosure.
FIG. 21B is another perspective view of the door of the tamper-resistant locking system of FIG. 21A.
FIG. 21C is a perspective view of another embodiment of a door jamb of the tamper-resistant locking system depicted in FIGS. 21A and 21B.

FIGS. 21A-21C depict another embodiment of a tamper-resistant locking system in accordance with an embodiment of the present disclosure. FIGS. 21A and 21B are perspective views of a door 2100 having a portion of the tamper-resistant locking system of the present disclosure. Further, FIG. 21C is a perspective view of a wall portion of the tamper-resistant locking system.

In this regard, FIG. 21A depicts a strike plate 2101 installed on the door 2100. In the door are openings 2102 and 2103, which are described further with reference to FIG. 20C.

FIG. 21B further depicts a door plate 2130. The door plate 2103 is L-shaped having a plate 2140 that is coupled to the door 2100 and a plate 2142 that is contiguous with and at a right angle to the plate 2140. In the embodiment depicted, the plate 2140 comprises a saw-tooth edge 2134.

FIG. 21C is a perspective view of a wall 2120 having a portion of the tamper-resistant locking system of the present disclosure corresponding to the door portion shown in FIGS. 21A and 21B. With reference to FIG. 21C, a lock 2170 installed in a door jamb 2150 is coupled to a wall 2120. When the lock 2170 is actuated, the lock bolt 2107 and the roller bolt 2108 protrude into the openings 2102 and 2103 (FIGS. 21A and 21B), respectively.

The embodiment shown depicts a tamper-resistant mechanism 2106 that comprises a frame consisting of three plates including a mounting plate 2133, a transition plate 2135, and an extension plate 2132. In one embodiment, the plates 2133, 2135, and 2132 are contiguous and made from a single piece of metallic material. However, the plates 2133, 2135, and 2132 need not be contiguous in other embodiments. The mechanism 2106 is mounted on a soffit 2051 of the doorjamb 2050. In one embodiment, the extension plate 2132 is formed above a surface of the soffit 2051 thereby defining a cavity 2152 between the extension plate 2132 and the surface of the soffit 2051.

In operation, when the door 2100 is closed, the plate 2140 (FIG. 21B) fits within the cavity 2153 defined by the extension plate 2132 and the surface of the soffit 2051. Because the saw-tooth plate 2142 fits within the cavity 2153, the chance of the lock bolt 2107 and the roller bolt 2108 being accessed by an object stuck between the doorjamb 2039 and the door 2100 is mitigated.

Figure 22A:
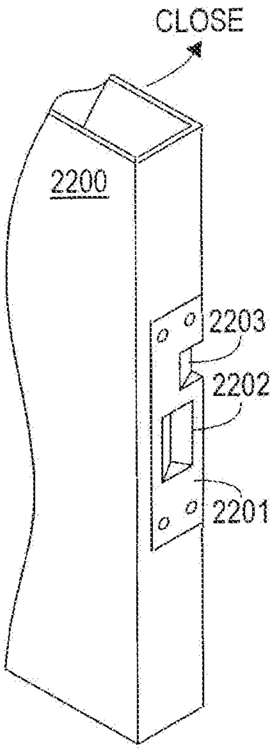
FIG. 22A is a perspective view of another embodiment of a door of a tamper-resistant locking system in accordance with the present disclosure.
Figure 22B:
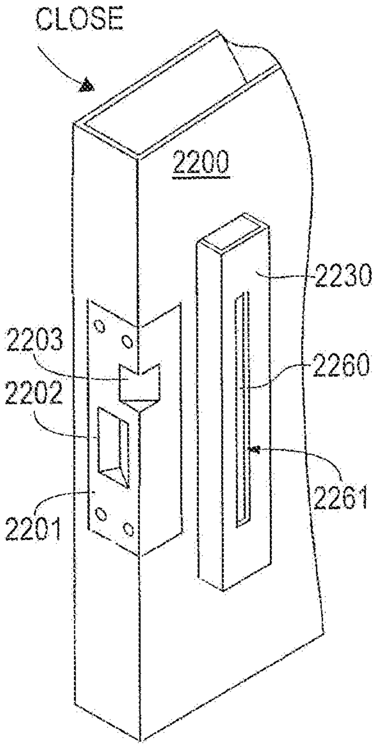
FIG. 22B is another perspective view of the door of the tamper-resistant locking system of FIG. 22A.
Figure 22C:
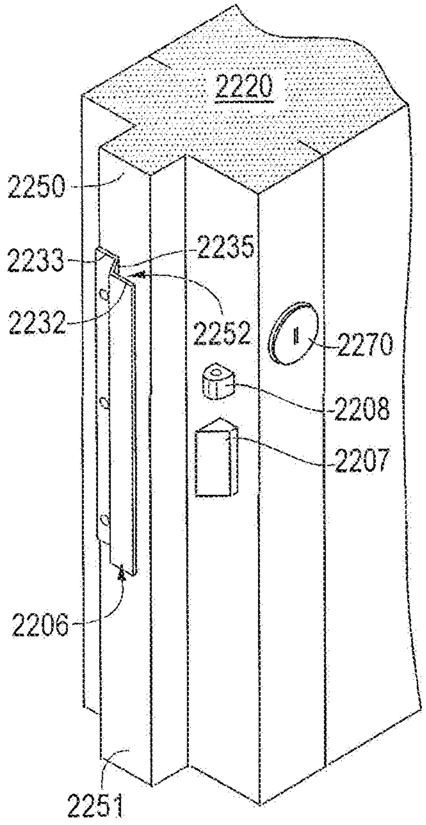
FIG. 22C is a perspective view of another embodiment of a doorjamb of the tamper-resistant locking system depicted in FIGS. 22A and 22B.

FIGS. 22A-22C depict another embodiment of a tamper-resistant locking system in accordance with an embodiment of the present disclosure. FIGS. 22A and 22B are perspective views of a door 2200 having a portion of the tamper-resistant locking system of the present disclosure. Further, FIG. 22C is a perspective view of a wall portion of the tamper-resistant locking system.

In this regard, FIG. 22A depicts a strike plate 2201 installed on the door 2200. In the door are openings 2202 and 2203, which are described further with reference to FIG. 20C.

FIG. 22B further depicts a door plate 2230 coupled to the door 2200. In one embodiment, the door plate 2230 is cuboidal and defines a cavity 2260. In another embodiment, the door plate 2230 may comprise a slot 2261.

FIG. 22C is a perspective view of a wall 2220 having a portion of the tamper-resistant locking system of the present disclosure corresponding to the door portion shown in FIGS. 22A and 22B. With reference to FIG. 22C, a lock 2270 installed in a door jamb 2250 is coupled to a wall 2220. When the lock 2270 is actuated, the lock bolt 2207 and the roller bolt 2208 protrude into the openings 2202 and 2203 (FIGS. 22A and 22B), respectively.

The embodiment shown depicts a tamper-resistant mechanism 2206 that comprises a frame consisting of three plates including a mounting plate 2233, a transition plate 2235, and an extension plate 2232. In one embodiment, the plates 2233, 2235, and 2232 are contiguous and made from a single piece of metallic material. However, the plates 2233, 2235, and 2232 need not be contiguous in other embodiments, but may be separate and distinct plates. The mechanism 2206 is mounted on a soffit 2251 of the doorjamb 2250. In one embodiment, the extension plate 2232 is formed above a surface of the soffit 2251 thereby defining a cavity 2252 between the extension plate 2232 and the surface of the soffit 2251.

In operation, when the door 2200 is closed, the cavity 2160 defined by the plate 2230 receives the extension plate 2232. In the embodiment wherein a slot 2161 is formed in the plate 2230, the extension plate 2232 is received by the slot 2161. In either scenario, because the extension plate 2232 is received by the cavity 2260 or the slot 2261, the chance of an individual being housed of using an object to actuate the lock bolt or the roller bolt is mitigated.

Figures 23A, 23B, 23C:
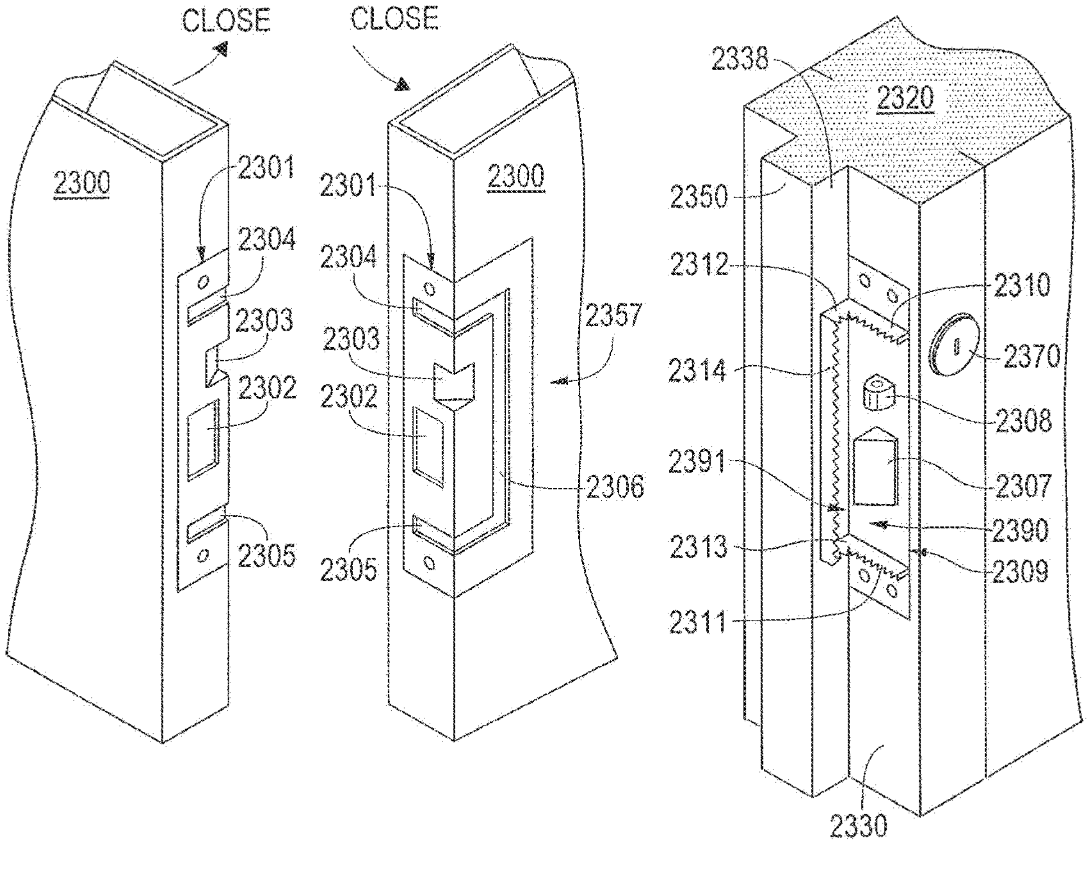
FIG. 23A is a perspective view of another embodiment of a door of a tamper-resistant locking system in accordance with the present disclosure.
FIG. 23B is another perspective view of the door of the tamper-resistant locking system of FIG. 23A.
FIG. 23C is a perspective view of another embodiment of a doorjamb of the tamper-resistant locking system depicted in FIGS. 23A and 23B.

FIGS. 23A-23C depict another embodiment of a tamper-resistant locking system in accordance with an embodiment of the present disclosure. FIGS. 23A and 23B are perspective views of a door 2300 having a portion of the tamper-resistant locking system of the present disclosure. Further, FIG. 34C is a perspective view of a wall portion of the tamper-resistant locking system.

In this regard, FIG. 23A depicts a strike plate 2301 installed on the door 2300. The strike plate 2301 is L-shaped, and extends from around the lock openings 2502 and 2503, at a right angle around the corner of the door 2300, and to an inside surface 2357 of the door 2300. Running parallel and both above and below the openings 2302 and 2303 are channels 2304 and 2305. In the embodiment depicted, the channels 2304 and 2305 are formed in the strike plate 2301.

FIG. 23B depicts another perspective view of the portion of the locking system installed on the door 1100. FIG. 11B depicts the two sides of the strike plate 2301, including both the plate portion that surrounds the openings 2502 and 2503 and the plate portion that covers a portion of the inside surface 2357 of the door 2300. Within the plate portion that covers the inside surface 2357 of the door 2300 is a U-shaped channel 2306 that is contiguous with the channels 2304 and 2305 and is also formed in the strike plate 2301.

FIG. 23C is a perspective view of a wall 2320 having a portion of the tamper-resistant locking system of the present disclosure corresponding to the door portion shown in FIGS. 23A and 23B. With reference to FIG. 23C, a lock 2370 installed in a doorjamb 2350 is coupled to a wall 2320. When the lock 2370 is actuated, the lock bolt 2307 and the roller bolt 2308 protrude into the openings 2302 and 2303 (FIGS. 23A and 23B), respectively.

The embodiment shown depicts a tamper-resistant mechanism 2309 that comprises two plates, including a lock plate 2390 and a stop plate 2391. The lock plate 2390 and the stop plate 2391 are integrally formed at a right angle and are mounted to the shoulder 2330 and the stop 2338. The lock plate 2390 comprises parallel and horizontal saw-tooth members 2310 and 2311 that run above and below the lock bolt 2307 and the roller bolt 2308 and are integral with the mechanism 2309. In addition, the tamper-resistant mechanism 2309 comprises two parallel and horizontal saw-tooth members 2312 and 2313 that are integral with the stop plate 2391 and that are contiguous with the members 2310 and 2311 at a corner coupling the lock plate 2390 with the stop plate 2391. The members 2312 and 2313 are contiguous with a vertical saw-tooth member 2314. The vertical saw-tooth member 2314 is also part of the stop plate 2391.

In operation, when the door 2300 is closed, the saw-tooth members 2310 and 2311 fit within the channels 2304 and 2305, respectively. In addition, the saw-tooth members 2312, 2313, and 2314 fit within the U-shaped channel 2306. Because the saw-tooth members 2310-2314 fit within the channels 2304-2306, the chance of an individual gaining access to the lock bolt 2307 and the roller bolt 2308 is mitigated.

Note that the saw-tooth members 2310-2314 are narrow strips of a durable material having saw-tooth or any type of irregular edge. In one embodiment, the narrow strips may be made of a metallic material, such as steel. The strips may be other types of durable material known in the art or future-developed that could withstand being prodded with an object through a narrow passage way between the doorjamb 2350 and the door 2300. Detention Cell Door Monitoring and Alert System A detention cell locking mechanism has a mechanism housing containing a lock bolt, a lock roller bolt, and a linkage connecting the roller bolt and the lock bolt. The mechanism housing may be located either internal to the detention cell wall or on the exterior of the cell. In one preferred, non-limiting, embodiment, the mechanism housing is located in the detention cell wall immediately adjacent to the cell door or on the exterior of the detention cell wall immediately adjacent to the cell door. Adjacent to the mechanism housing on the opposite surface is a strike plate configured to (a) depress the roller bolt and (b) provide an opening for receiving the lock bolt. The roller bolt and lock bolt work cooperatively together. When the cell door is open under normal operations the roller bolt and lock bolt are extended, and the lock bolt is not dead locked. When the cell door is closed under normal operations the roller bolt is depressed by the cell door and the lock bolt is fully extended into the strike opening, and dead locked. When the cell door is open and the roller bolt has been compromised by jamming or otherwise damaging it, the roller bolt is depressed and the lock bolt is extended and therefore dead locked. The inmate may then slam the door shut and break the dead lock linkage in the lock.

When the cell door is closed and the lock bolt has been compromised by jamming or otherwise damaging it, the roller bolt is depressed by the closed door but the lock bolt is only partially extended and the lock bolt is not dead locked. There can be numerous reasons why the lock bolt only partially extends. A common reason is due to inmates stuffing objects into the lock bolt opening in the strike, thereby limiting the lock bolt's range of motion. Thereby creating a situation where an inmate can defeat the detention cell lock.

One or more sensors are used to determine the state of the detention cell door. The state of the detention cell door is either open or closed. The door sensors can be magnetic, or any other sensor known to a person of ordinary skill in the art. The state of the cell door is determined by the sensor and transmitted to a monitoring system or logic engine.

One or more sensors, solenoids, or switches are used to determine the state of the lock bolt. The state of the lock bolt is monitored directly to determine if the lock bolt is fully extended and thereby dead locked or not fully extended. In an alternative embodiment, the lock bolt may also be monitored by monitoring the linkage that connects the lock bolt and roller bolter. The lock bolt sensors can be a solenoid with an integrated sensor, a magnetic sensor, a switch, a limit switch or any other type of sensor known to a person of ordinary skill in the art. In an alternative embodiment, the roller bolt sensors determines the location of the linkage connecting the roller bolt and the lock bolt as an indication of the lock bolt state. In addition, the state of the lock bolt is determined by the sensor and transmitted to a monitoring system or logic engine.

In the present invention, one or more sensors are used to determine the state of the roller bolt. The state of the roller bolt is either extended or not extended. The roller bolt sensors can be a solenoid with an integrated sensor, a magnetic sensor, a switch, a limit switch or any other type of sensor known to a person of ordinary skill in the art. The sensor detects the state of the roller bolt as either fully extended or not extended. Full depression of the roller bolt is not required to engage the not extended state. Once the roller bolt is depressed in the slightest way the sensor detects the movement and state of the roller bolt then in the not extended state. The state of the roller bolt is determined by the sensor and transmitted to a monitoring system.

In an alternative embodiment, instead of being a binary variable (extended or not extended) the state of the roller bolt may be a range from the fully depressed state to the fully extended state. The roller bolt sensor can be used to determine the state of the roller bolt within the fully depressed to fully extended range. The sensor can be a solenoid with an integrated sensor, a magnetic sensor, a limit switch or any other type of sensor known to a person of ordinary skill in the art. In addition, the state of the roller bolt is determined by the sensor and transmitted to a monitoring system.

The monitoring system is comprised of a programmable logic engine capable of handling a plurality of inputs and outputs. The monitoring system preferably provides continuous monitory of the system. In an alternative embodiment, the system can provide intermittent monitoring at predetermined intervals. The inputs to the programmable engine consists of at least the status of the (a) detention cell door (either open or closed); (b) lock bolt (fully extended or not fully extended); and, (c) roller bolt (extended or not fully extended). In an alternative embodiment, the status of the roller bolt may be determined in the range from fully extended to fully depressed. The outputs from the programmable logic engine consist of at least the following: (a) normal unlocked state where the door is open and both the roller bolt and lock bolt are extended; (b) normal locked state where the door is closed and the roller bolt is not fully extended (depressed) and the lock bolt is fully extended (and dead locked); and, (c) inmate tampering where the door is open and the roller bolt is not fully extended (depressed or partially depressed); or (d) inmate tampering where the door is closed and the roller bolt is depressed and the lock bolt is partially extended but not dead locked.

One or more visual indicators are provided for each cell door. A visual indicator is located on the outside of the detention cell, preferably in a highly visible location like on the locking mechanism housing, the cell door, or on the adjacent wall exterior to the cell.

Optionally, an additional visual indicator for each detention cell door may be provided in one or more remote locations (i.e. a bank of visual indicators for all cell doors in a facility, or a subsection thereof).

In an alternative embodiment, one or more audible indicators are provided for each cell door. The audible indicator may be presented on a speaker for playing audible sounds. The speaker may be located in one or more of the following locations: the lock housing, outside the detention sell door, or in a remote location. Preferably, the audible indicator sounds an alert tone when the door is open and the roller bolt is partially depressed. Thereby alerting a correctional officer to this malicious conduct and permitting an officer to intercede before the lock is damaged. If the door is open and the roller bolt is depressed to a point where the lock bolt is deadlocked, then a visual indicator is also activated to alert a correctional officer to this situation. The visual indicator is preferably a flashing red light.

In another alternative embodiment, the indicator may be visual, audible, or visual and audible. A combination of visual and audible indicators may also be provided to address a user's preference. For example, a visual and audible indicated may be provided outside the detention cell door and only a visual indicator provided at a remote monitoring location.

Each separate detection state will have a unique visual indicator status. By way of example the normal unlocked state is represented by a solid red light; the normal locked state is represented by a solid green light; and, the inmate tampering state is represented by a flashing red light. Other visual indicator means contemplated by this invention and may be used without deviating from the scope of the invention.

Figure 24:
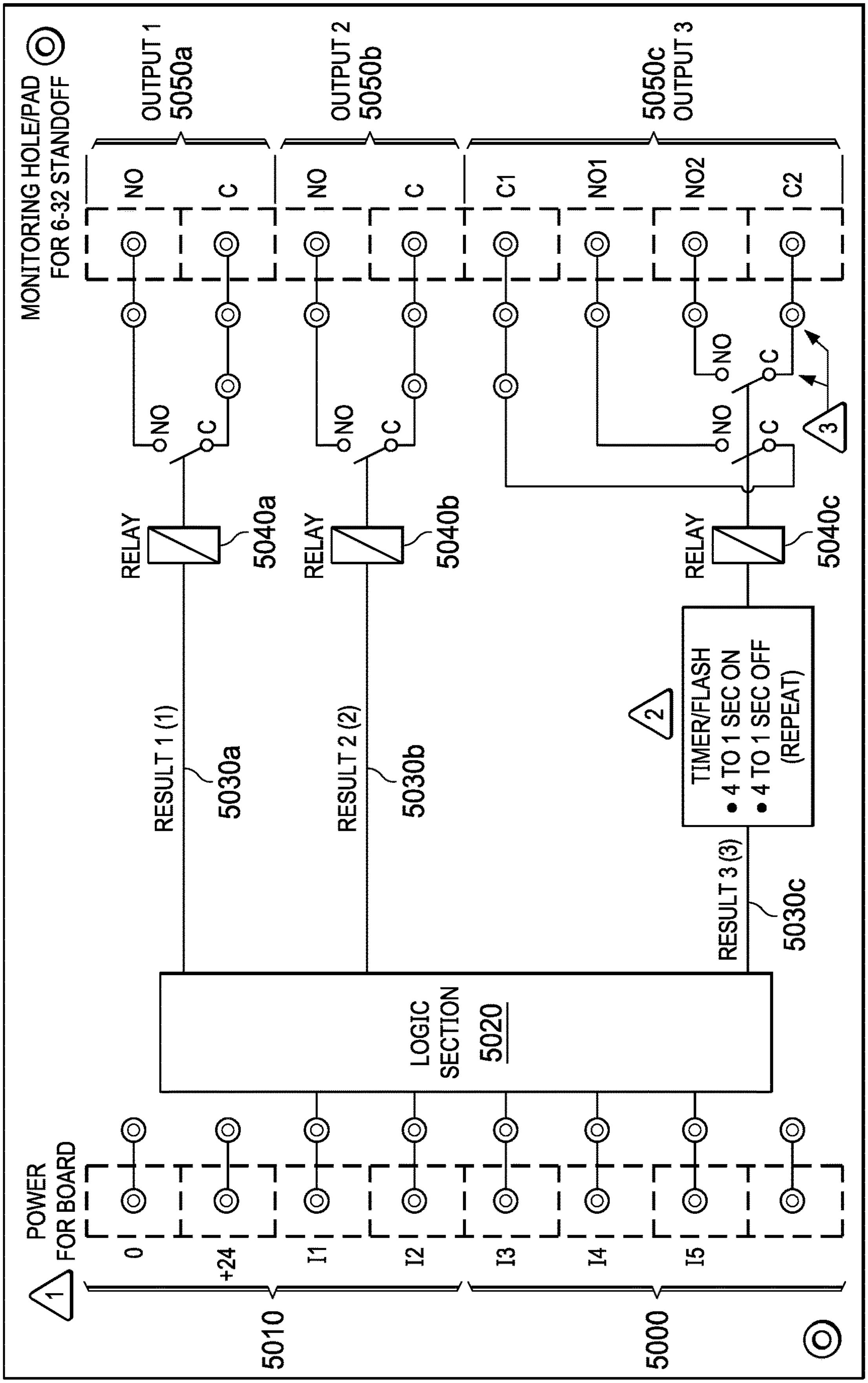
FIG. 24 shows a circuit with three (3) inputs, a logic engine, and three (3) outputs.

FIG. 24 shows the wiring diagram with a plurality of inputs 5000. Power is supplied to the circuit 5010, preferably at 24 volts. The plurality of inputs are processed by the logic engine 5020 to generate a plurality of results 5030*a*, 5030*b*, 5030*c*. Each result 5030 is connected to a relay and switch 5040*a*, 5040*b*, 5040*c* used to determine the status of variable being monitored, measured, or status determined. Each result 5030 corresponds to an output 5050*a*, 5050*b*, 5050*c*.

Figure 25:
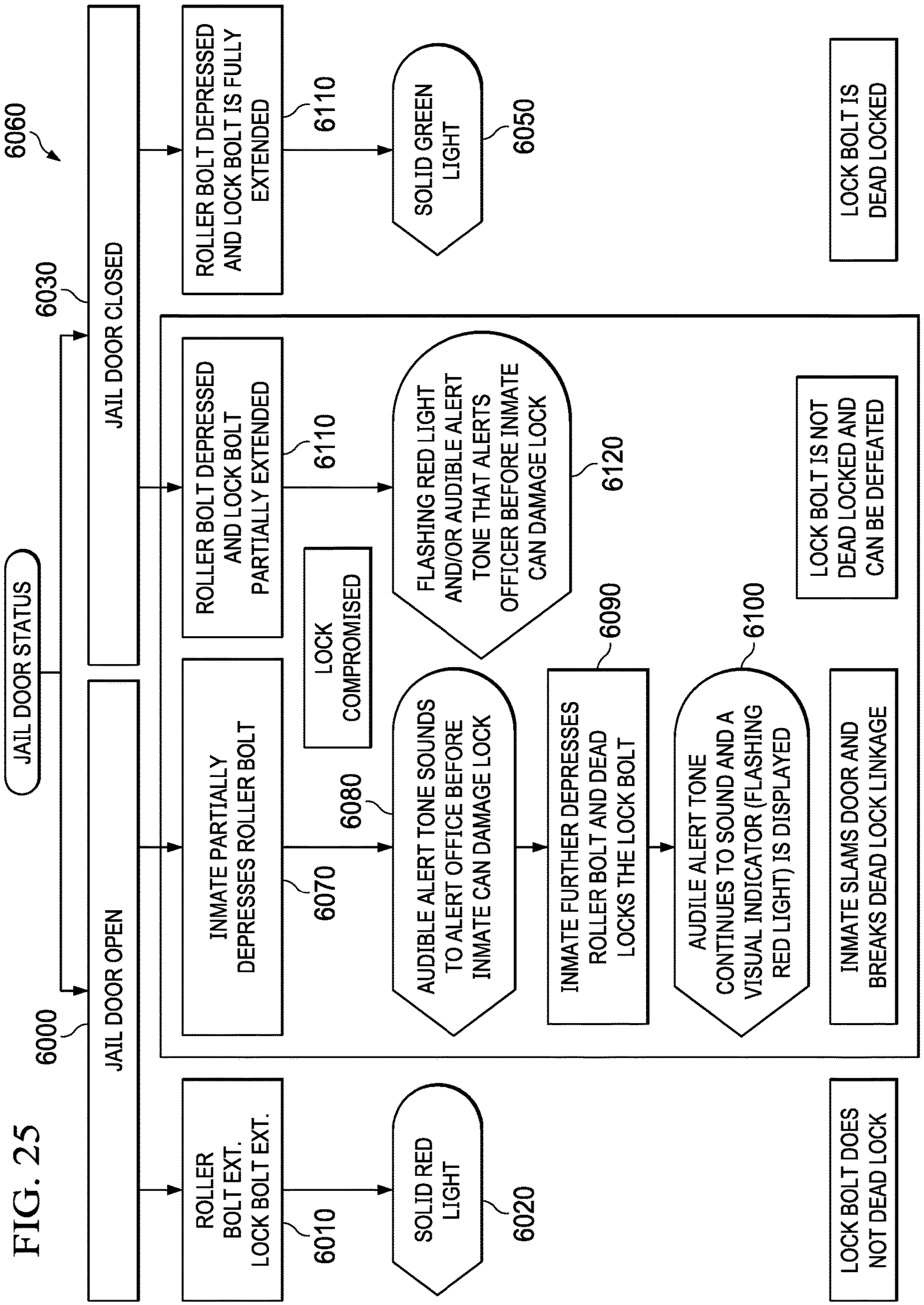
FIG. 25 shows a logic flow chart for determining the alert states for a detention cell door and lock.

FIG. 25 shows the logic used by a logic engine 5020 for a three (3) input circuit. In the logic engine 5020, I1 is the input from the door as being open (0) or closed (1); I2 is the input from lock bolt as being either retracted (0) or fully extended (1); and I3 is the input from the roller bolt as not fully extended (0) or fully extended (1). The outputs are represented as a green LED (meaning all clear), solid red light or flashing red light, both indicating alert states. In an alternative embodiment, the inputs may include audible tones in place of the solid or flashing light, or in addition to the light.

FIG. 26 shows the logic used by the monitoring system logic engine 5020 for a three (3) input circuit. In the logic engine 5020, I1 is the input from the door as being open (0) or closed (1); I2 is the input from lock bolt as being either retracted (0) or fully extended (1); and I3 is the input from the roller bolt as not fully extended (0) or fully extended (1). The outputs are represented as a green light (meaning all clear), solid red light or flashing red light, both indicating alert states. In an alternative embodiment, the inputs may include audible tones in place of the solid or flashing light, or in addition to the light.

As described above and shown in the associated drawings, the present invention comprises an apparatus for a detention facility cell door lock housing assembly and monitoring system. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What we claim is the following:

1. A locking apparatus comprising:

a first wall including a first jamb surface, a first stop surface, and a soffit surface, the first jamb surface extending in a first direction, the first stop surface extending from the first jamb surface in a second direction transverse to the first direction, and the soffit surface extending from the first stop surface in the first direction, the first jamb surface defining a first opening configured to receive a lock bolt;

a second wall including a second jamb surface and a second stop surface, the second jamb surface extending in a third direction, the second stop surface extending from the second jamb surface in a fourth direction transverse to the third direction, the second wall defining a second opening opposite the first opening;

a first strip disposed above the lock bolt and extending from the first jamb surface;

a second strip disposed below the lock bolt and extending from the first jamb surface;

a third strip extending between the first strip and the second strip; a first channel formed in the second jamb surface and configured to receive the first strip;

a second channel formed in the second jamb surface and configured to receive the second strip; and a third channel formed in the second stop surface and extending between the first channel and the second channel, the third channel configured to receive the third strip.

2. The locking apparatus of claim 1, wherein the first strip extends horizontally from the first jamb surface.

3. The locking apparatus of claim 1, wherein the third strip extends transversely from the first strip and the second strip.

4. The locking apparatus of claim 1, wherein the third strip extends vertically from the first strip to the second strip.

5. The locking apparatus of claim 1, further comprising a lock bolt disposed within the first opening.

6. The locking apparatus of claim 5, further comprising a lock for actuating the lock bolt.

7. The locking apparatus of claim 1, further comprising a flange extending from the second jamb surface.

8. The locking apparatus of claim 7, further comprising a rabbet configured to receive the flange.

9. The locking apparatus of claim 1, wherein the first strip extends from the first stop surface, the second strip extends from the first stop surface, and the third strip extends from the first stop surface.

10. The locking apparatus of claim 9, wherein the first strip extends horizontally along the first stop surface.

11. A locking apparatus comprising:

a first wall including a first jamb surface, a first stop surface, and a soffit surface, the first jamb surface extending in a first direction, the first stop surface extending from the first jamb surface in a second direction transverse to the first direction, and the soffit surface extending from the first stop surface in the first direction, the first jamb surface defining a first opening configured to receive a lock bolt;

a second wall including a second jamb surface and a second stop surface, the second jamb surface extending in a third direction, the second stop surface extending from the second jamb surface in a fourth direction transverse to the third direction, the second wall defining a second opening opposite the first opening;

a first strip disposed above the lock bolt and extending from the first stop surface;

a second strip disposed below the lock bolt and extending from the first stop surface;

a third strip extending between the first strip and the second strip;

a first channel formed in the second stop surface and configured to receive the first strip;

a second channel formed in the second stop surface and configured to receive the second strip; and a third channel formed in the second stop surface and extending between the first channel and the second channel, the third channel configured to receive the third strip.

12. The locking apparatus of claim 11, wherein the first strip extends horizontally along the first stop surface.

13. The locking apparatus of claim 11, wherein the third strip extends transversely from the first strip and the second strip.

14. The locking apparatus of claim 11, wherein the third strip extends vertically from the first strip to the second strip.

15. The locking apparatus of claim 11, further comprising a lock bolt disposed within the first opening.

16. The locking apparatus of claim 15, further comprising a lock for actuating the lock bolt.

17. The locking apparatus of claim 11, further comprising a flange extending from the second jamb surface.

18. The locking apparatus of claim 17, further comprising a rabbet configured to receive the flange.

19. The locking apparatus of claim 10, wherein the first strip extends from the first jamb surface, and the second strip extends from the first jamb surface.

20. The locking apparatus of claim 19, wherein the first strip extends horizontally along the first jamb surface.

* * * * *